(12) United States Patent  (10) Patent No.: US 6,322,091 B1
Lindley  (45) Date of Patent: Nov. 27, 2001

(54) PIN RETRACTOR OPERATOR

(76) Inventor: Joseph W. Lindley, 201 Matthew Dr., Paducah, KY (US) 42001

( * ) Notice: Subject to any disclaimer, the term of this patent is extended or adjusted under 35 U.S.C. 154(b) by 0 days.

(21) Appl. No.: 09/389,796

(22) Filed: Sep. 3, 1999

Related U.S. Application Data

(60) Provisional application No. 60/098,923, filed on Sep. 3, 1998, and provisional application No. 60/138,186, filed on Jun. 8, 1999.

(51) Int. Cl.[7] ................................................. B62D 53/06
(52) U.S. Cl. .............................. 280/149.2; 280/407.1; 74/470; 180/209
(58) Field of Search ........................ 280/149.2, 405.1, 280/407.1, 80.1, 638; 180/209, 24.01; 74/424.8 A, 470

(56) References Cited

U.S. PATENT DOCUMENTS

| 1,265,705 |   | 5/1918 | Litchfield . | |
| 1,314,498 |   | 9/1919 | Bower . | |
| 1,367,094 |   | 2/1921 | Ragona . | |
| 2,709,079 |   | 5/1955 | Bubb et al. . | |
| 2,818,272 |   | 12/1957 | DeLay . | |
| 2,831,735 |   | 4/1958 | Bennett et al. . | |
| 3,177,002 |   | 4/1965 | Schmidt . | |
| 3,319,488 |   | 5/1967 | Bentley et al. . | |
| 3,345,038 |   | 10/1967 | Taylor . | |
| 3,618,969 | * | 11/1971 | Glassmeyer | 280/149.2 |
| 3,778,079 | * | 12/1973 | Vornberger et al. | 280/149.2 |
| 4,146,250 | * | 3/1979 | DenHerder . | |
| 4,251,089 |   | 2/1981 | Skaggs . | |
| 4,252,359 | * | 2/1981 | Cooper | 74/470 |
| 4,286,797 |   | 9/1981 | Mekosh, Jr. et al. . | |
| 4,641,846 |   | 2/1987 | Ehrhart . | |
| 4,838,566 |   | 6/1989 | Baxter et al. . | |
| 4,944,522 |   | 7/1990 | Hart . | |
| 4,993,737 | * | 2/1991 | Torcomian | 280/407 |
| 5,449,190 |   | 9/1995 | Ford . | |
| 5,480,171 | * | 1/1996 | Cheffey | 280/149.2 |
| 5,564,725 | * | 10/1996 | Brazeal | 280/149.2 |
| 5,813,682 | * | 9/1998 | Stevens | 280/149.2 |

OTHER PUBLICATIONS

Quality Products advertisement, The Rod Jumper™ "Axle Slider Tool", Jan. 1998, 1 page.

* cited by examiner

Primary Examiner—Kenneth R. Rice
Assistant Examiner—Lynda Jasmin
(74) Attorney, Agent, or Firm—Barnes & Thornburg

(57) ABSTRACT

A pin retractor operator is provided for use on a trailer having a movable bogie secured to the trailer frame with pins which are retractable by pulling on a handle of a pin retractor. The pin retractor operator includes a case for engaging the bogie, a handle engager coupled to a spring both of which are within the case. A tensioner extends through the case and is coupled to the spring so that linear movement of the tensioner stores energy within the spring when the handle of the pin retractor is received in the handle engager. A regulator coupled to the case controls movement of the tensioner. Tension stored in the spring pulls on the handle of the pin retractor while urging the case against the bogie allowing the trailer to be moved relative to the bogie with the pin retractor operator attached to the bogie. Components of the tensioner are adapted to serve as a positioning mechanism.

26 Claims, 31 Drawing Sheets

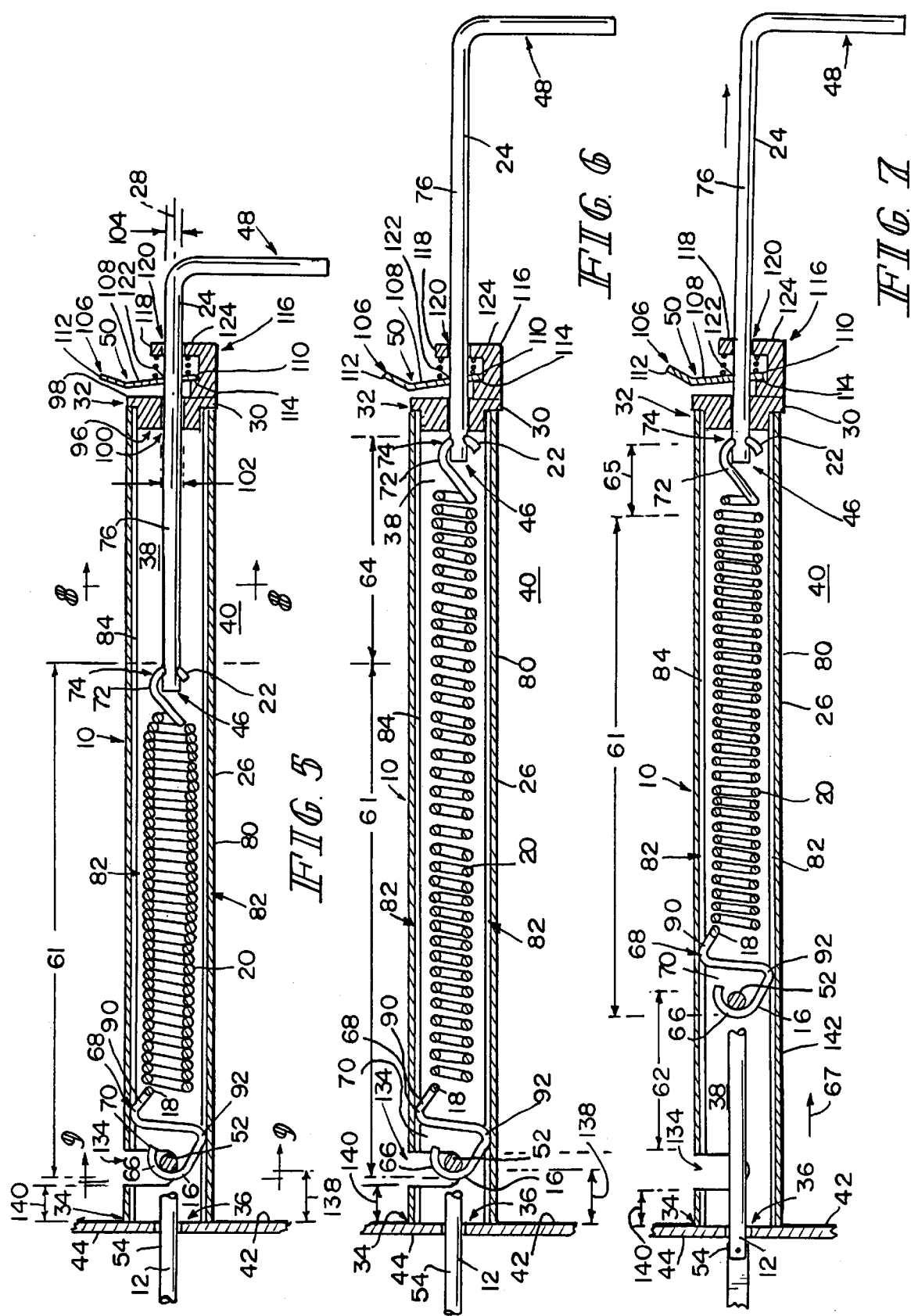

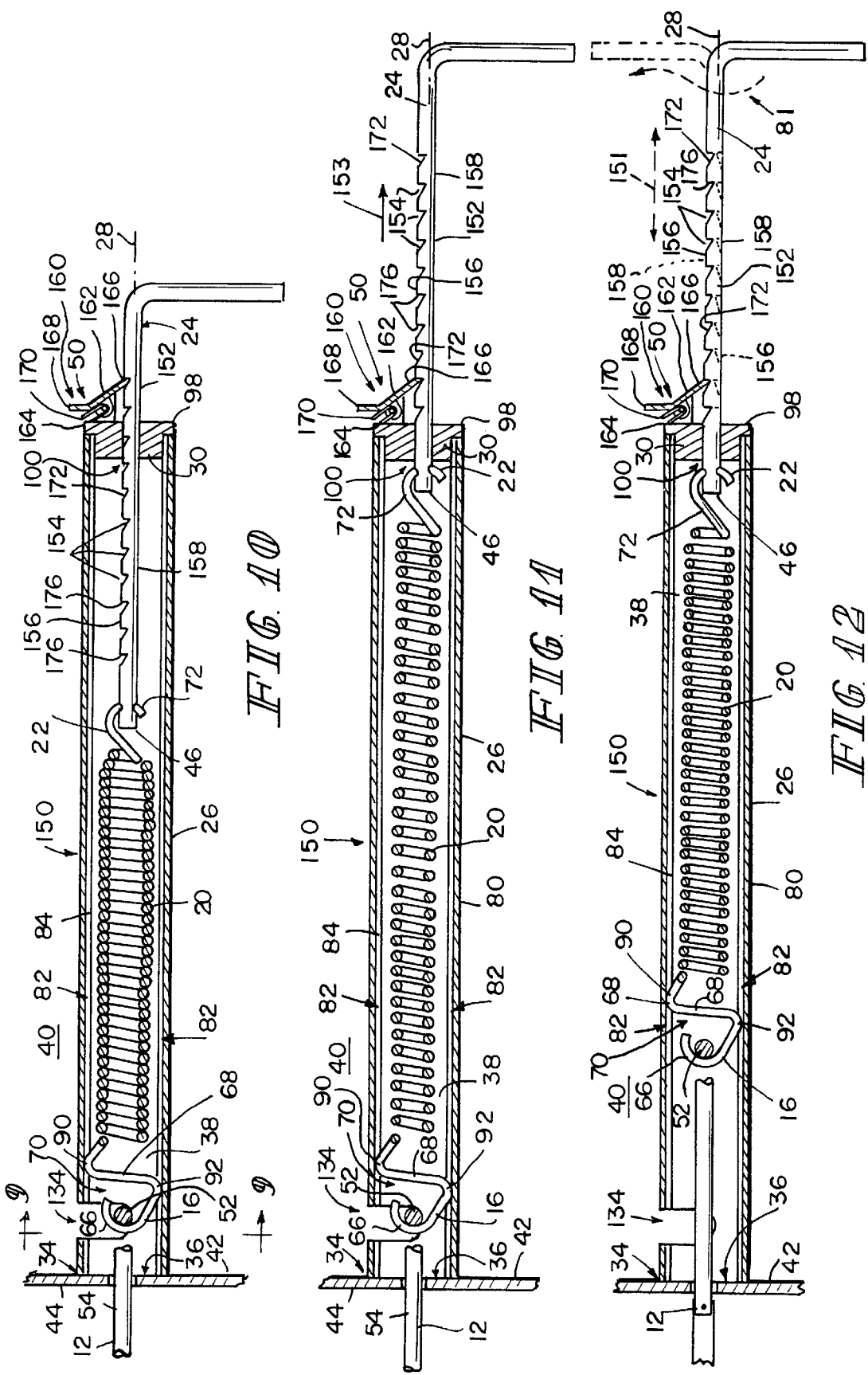

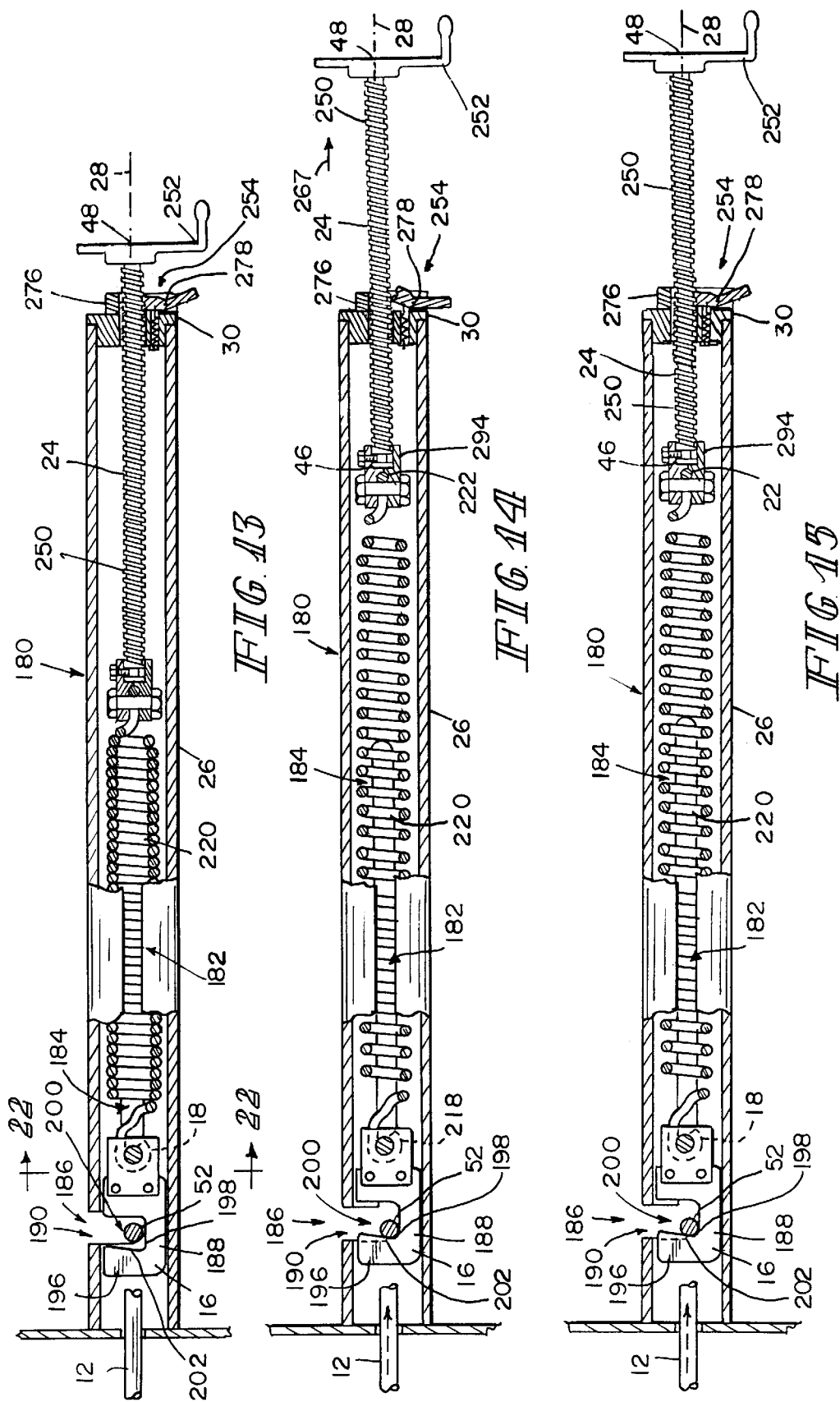

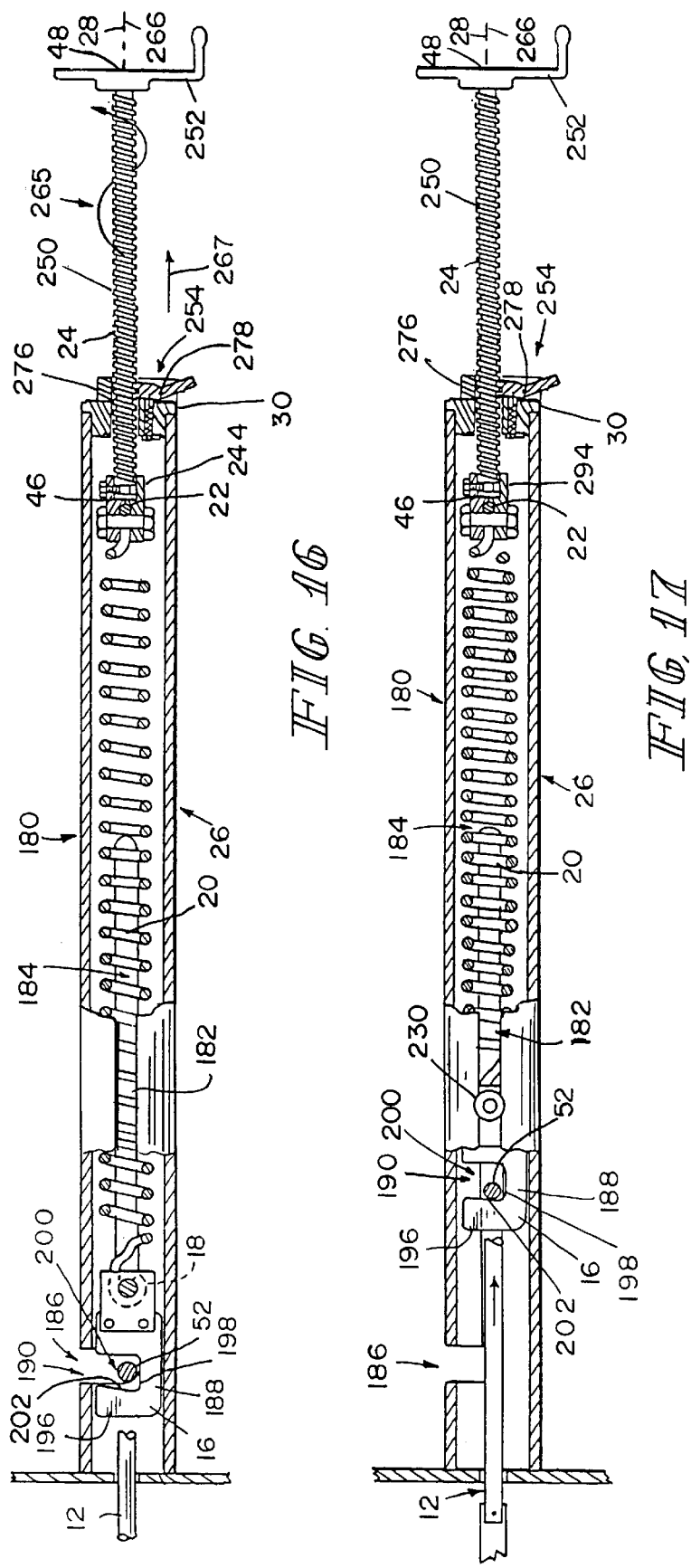

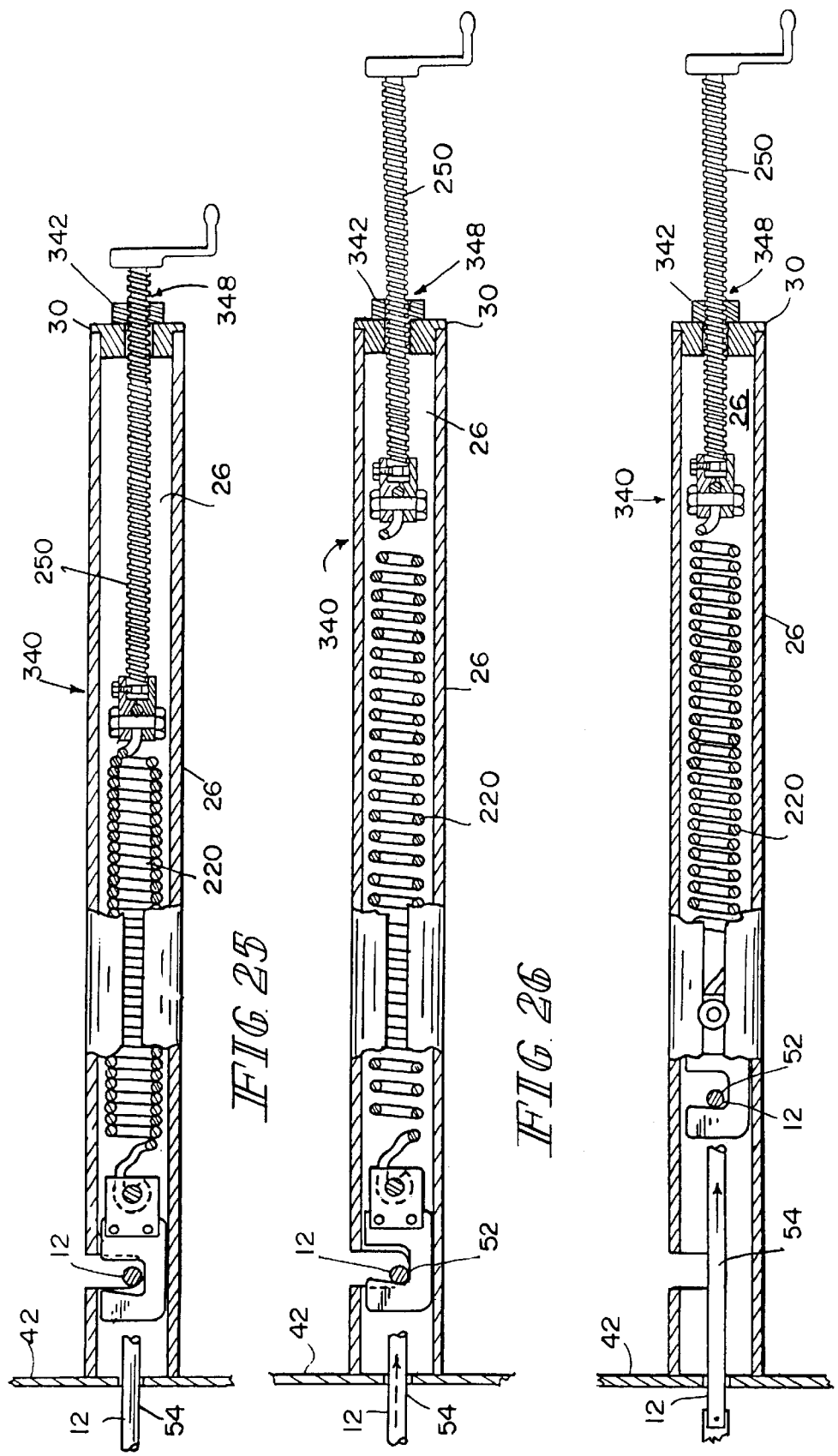

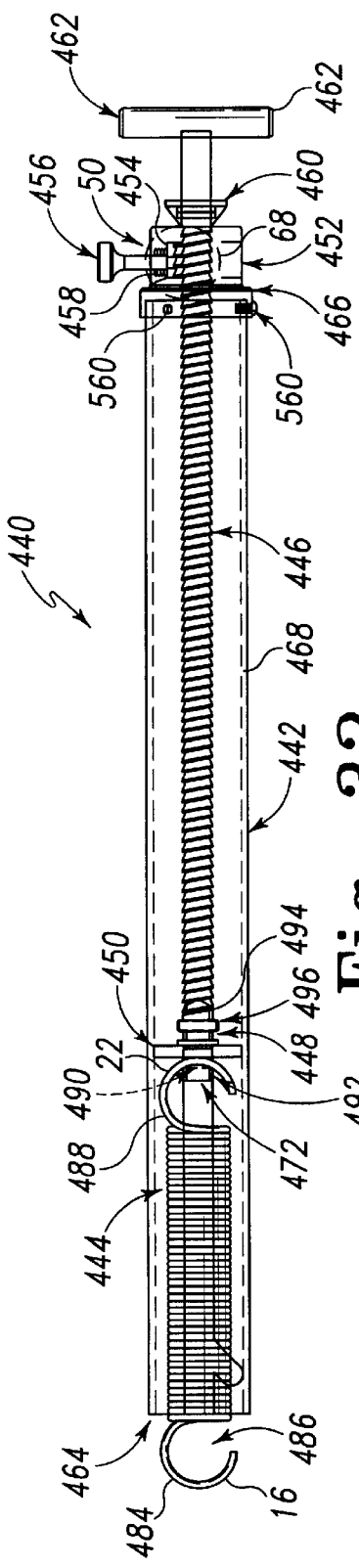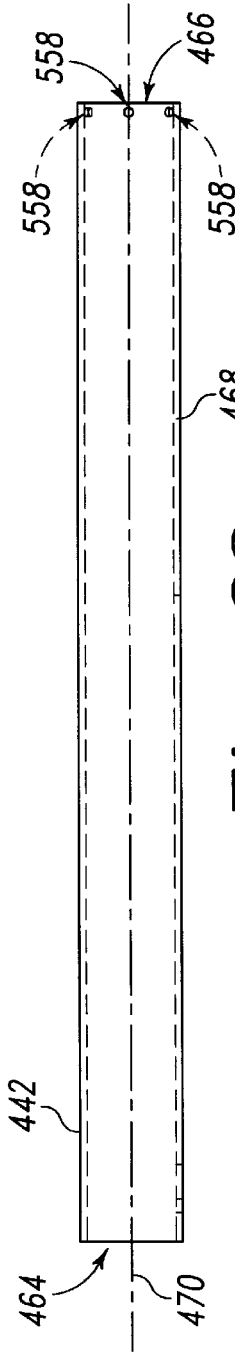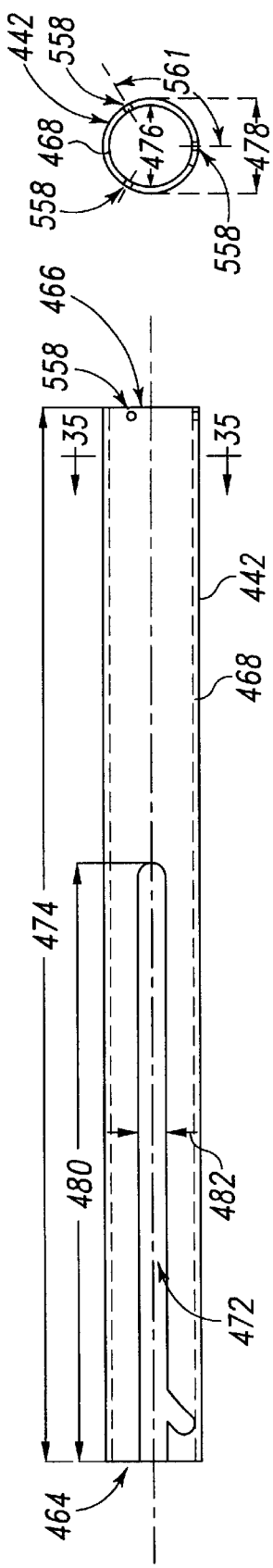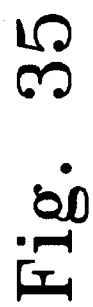
Fig. 32
Fig. 33
Fig. 34
Fig. 35

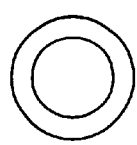 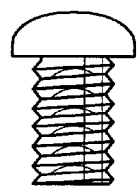
Fig. 52     Fig. 53
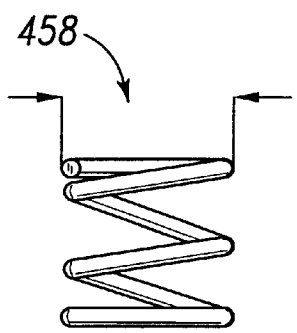 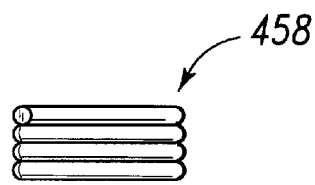
Fig. 54     Fig. 55
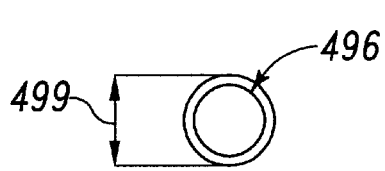 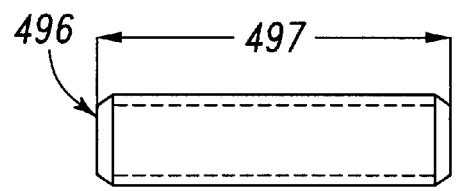
Fig. 56     Fig. 57

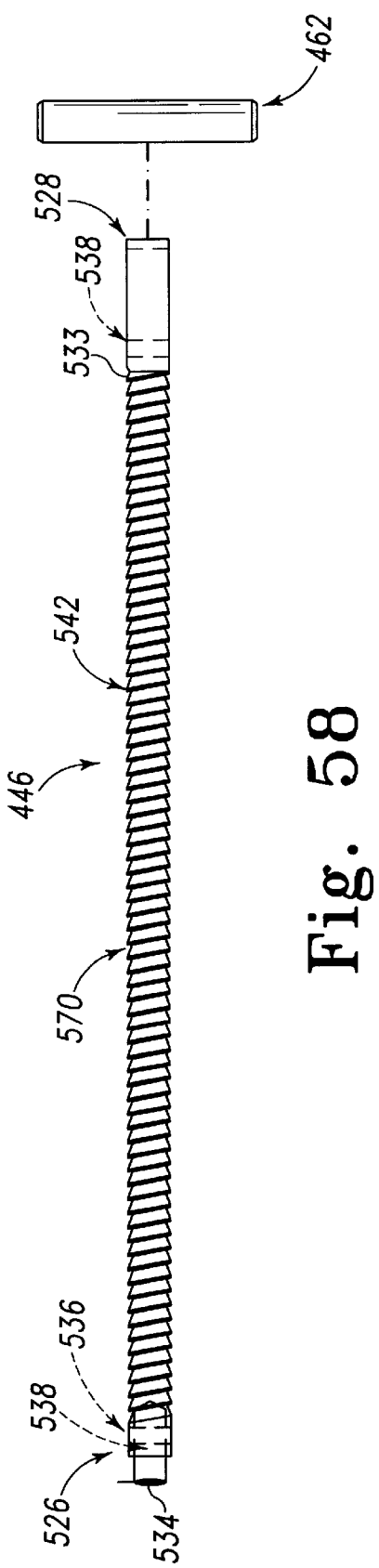
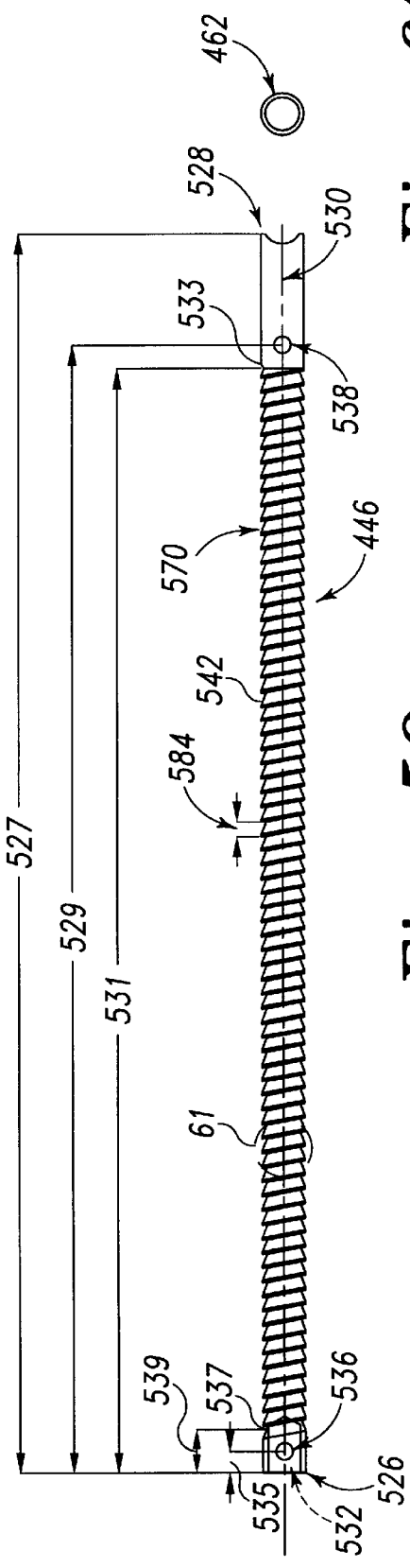

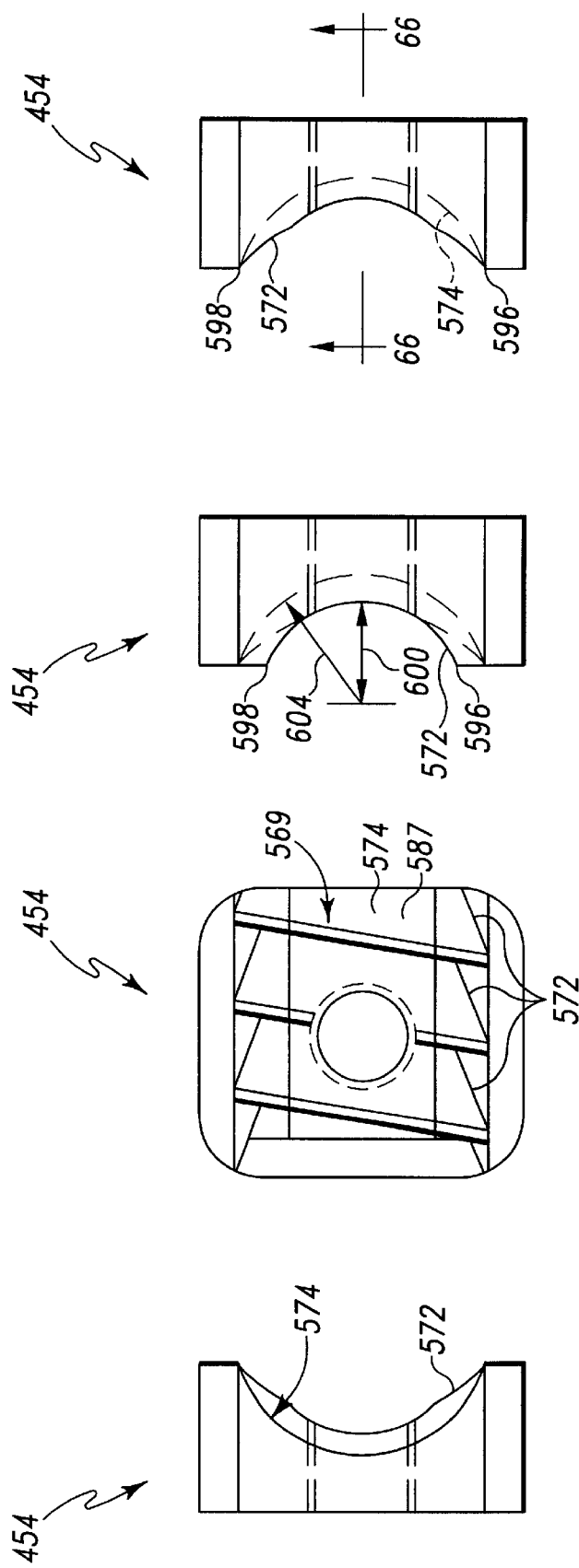

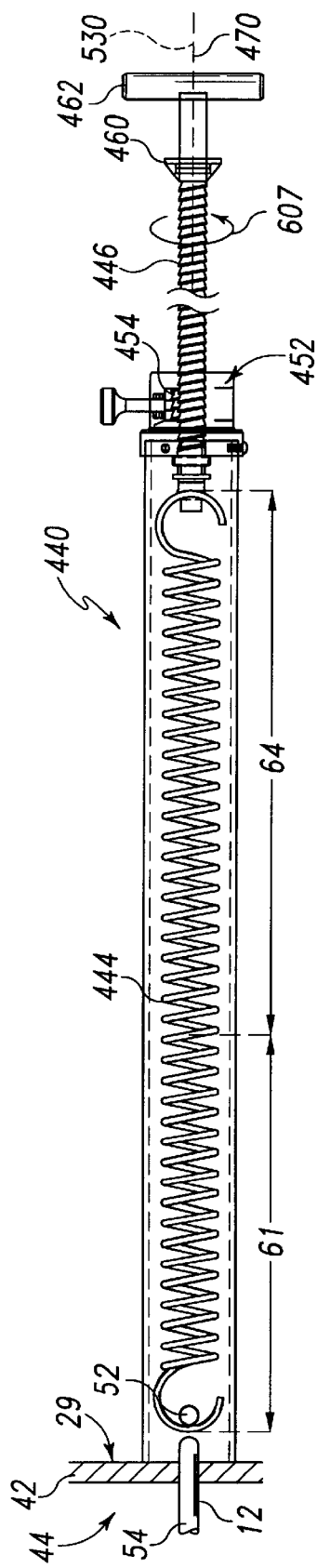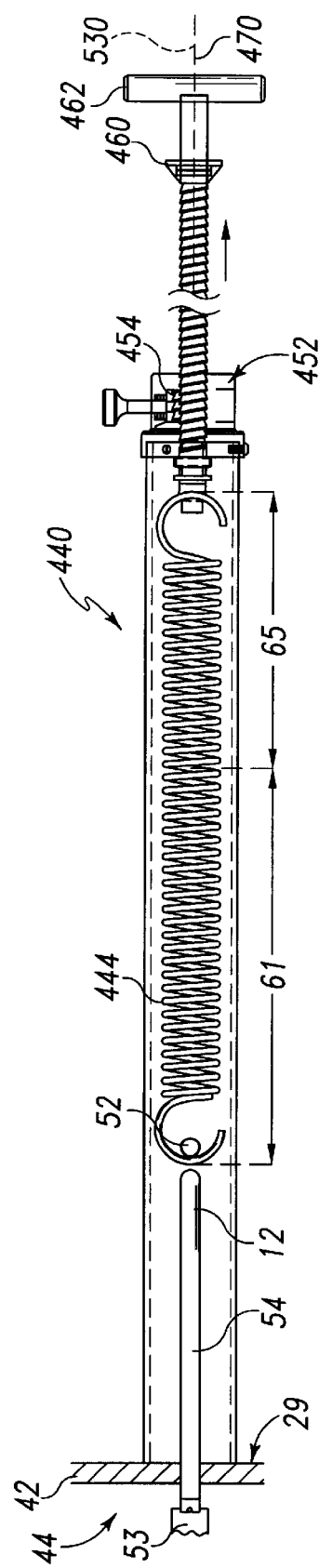

PIN RETRACTOR OPERATOR

CROSS-REFERENCE TO RELATED APPLICATIONS

This application claims the benefit of the provisional application 60/098,923 filed on Sep. 3, 1998, and the supplemental provisional application 60/138,186 filed on Jun. 8, 1999.

BACKGROUND OF THE INVENTION

This invention relates to an apparatus for use with semi-trailers, and more particularly to apparatus for retracting bogie-locking coupling pins to facilitate positioning of bogies under the bed of a semitrailer. More particularly, this invention relates to an operator for a pin retractor mounted on a bogie included in a tractor trailer rig. This invention also relates to mechanisms including a threaded shaft and a partial nut which allows lineal movement between the shaft and partial nut through rotational motion of the shaft or an axial pulling motion exerted on the shaft.

Tractor trailer rigs include trailer beds that are supported above a roadway by a tandem-wheeled "bogie". Truck drivers find that it is necessary to move the trailer bed forward and backward relative to the bogie to support the load that they intend to carry on the trailer bed properly. Pins are used to lock a trailer bed in a fixed position relative to an underlying bogie. These pins must be dislodged, often-times not an easy task, to enable a truck driver to move or reposition the trailer bed relative to the underlying bogie.

Drivers dislodge the pins by operating the tractor to rock the trailer bed forward and backward while someone, or some device, pulls on a handle of a pin retractor mounted to the bogie to retract the pins and decouple the trailer bed from the bogie. Drivers would welcome a detachable pin retractor operator that is attached to the bogie to pull on the handle of the pin retractor while the driver operates the tractor to rock the trailer bed until the pins coupling the trailer bed to the bogie are retracted and which does not need to be removed prior to repositioning the trailer bed over the bogie.

SUMMARY OF THE INVENTION

According to the present invention, a pin retractor operator is provided with a case containing a handle engager adapted to be coupled to a handle of a pin retractor, a spring coupled at one end to the handle engager, and a tensioner coupled to another end of the spring and arranged to extend out of the case. Movement of the tensioner relative to the case can be selectively blocked by a movement regulator included in the pin retractor operator.

In preferred embodiments, when the handle of the pin retractor is coupled to the handle engager and the case contacts the frame of the bogie, the tensioner is pulled and/or rotated by a truck driver to stretch the spring and then movement of the tensioner relative to the case is blocked by the movement regulator so that the stretched spring pulls against the handle of the pin retractor and urges the case against the frame of the bogie. Once the spring has been sufficiently stretched, the pin retractor operator may be left unattended thereby freeing the driver to climb into the cab and to operate the tractor to rock the trailer bed so as to induce retraction of the pins. The truck driver can then drive the tractor to reposition the trailer bed relative to the bogie while the pin retractor operator remains unattended and secured to the bogie.

One combination of tensioner and movement regulator which may be used in the pin retractor includes a threaded shaft which is engaged by a partial nut including partial threads biased by a biasing spring against the thread of the shaft. During a pulling action, the partial threads of the nut ride over the thread of the shaft urging the partial nut away from the shaft and compressing the biasing spring. After the shaft has moved a distance approximately equal to the pitch of the thread, the biasing spring partially decompresses to urge the partial threads of the partial nut into the next thread channel of the shaft. Once the spring has been partially stretched by the pulling force, the bias spring seats the partial threads of the partial nut within the thread channel of the shaft. The shaft may then be rotated to move the shaft further axially with respect to the partial nut. Thus, threaded shaft and partial nut biased against the threaded shaft is adapted for use as a positioning mechanism which allows rough positioning to be accomplished by pulling on the shaft and fine positioning to be accomplished by rotating the shaft.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 2 is a partial cross sectional view of the tractor trailer rig taken along lines 2—2 of FIG. 1 showing one spring-loaded pin coupled to the left side of the bogie frame and biased to couple the trailer bed frame to one part of the bogie frame, another spring-loaded pin coupled to the right side of the bogie frame and biased to couple the trailer bed frame to another part of the bogie frame, a four-link pin retractor including a pivot link mounted for pivotable movement on the bogie frame, a left pin link coupled to the left side spring-loaded pin and the pivot link, a right pin link coupled to the right side spring-loaded pin and the pivot link, and a handle coupled to a lowest end of the pivot link and showing a pin retractor operator in accordance with a first embodiment of the present invention coupled to a free end of the handle of the pin retractor and engaging the frame of the bogie so that movement of the trailer bed relative to the bogie in no way affects the pin retractor operator;

FIG. 3 is a view similar to FIG. 2 showing an L-shaped tensioner of the pin retractor operator extended relative to the case to stretch an internal spring which is applying a pulling force to the handle of the pin retractor to cause the pivot link to pivot about its pivot point so that left and right pin links pull on the left-side and right-side spring-loaded pins;

FIG. 4 is a view similar to FIGS. 2 and 3 showing the pins after they have been retracted from the pin holes to decouple the trailer bed from the bogie so that the trailer bed may be moved relative to bogie to the phantom position as shown in FIG. 1 and showing the pin retractor operator secured to the bogie in a position where it does not interfere with trailer movement so that the driver does not need to remove the pin retractor operator prior to repositioning trailer bed relative to bogie;

FIG. 5 is a cross sectional view taken along line 5—5 of FIG. 1 of the pin retractor operator (in the same state as is shown in FIG. 2) showing a case containing an unstretched spring providing a handle engager at one end coupled to the handle of the pin retractor and a tensioner coupled to the other end of the spring and configured to include an L-shaped hand grip;

FIG. 6 is a view similar to FIG. 5 showing the tensioner moved to stretch the spring to exert a pulling force on the handle of the pin retractor and showing a latch that engages the tensioner to retain the tensioner in an extended fixed position relative to the case to maintain the spring in a stretched state in the case so as to maintain the pulling force applied to the handle of the pin retractor until the spring-loaded pins are moved to decouple the trailer bed and the bogie as shown in FIG. 4;

FIG. 7 is a view similar to FIGS. 5 and 6 after the pins have been retracted and the pin retractor handle has moved to the position shown in FIG. 4 so that the trailer bed may be repositioned over the bogie while the pin retractor operator remains attached to the bogie;

FIG. 10 is a cross sectional view (similar to FIG. 5) of a second embodiment of a pin retractor operator in accordance with the present invention showing a semi-toothed rod acting as a tensioner in the pin retractor operator;

FIG. 11 is a cross sectional view (similar to FIG. 6) of the pin retractor operator of FIG. 10 showing the spring of the pin retractor operator in a stretched state and the movement of tensioner to the position shown in FIG. 10 blocked by a pawl engaging a wall of a tooth on the semi-toothed rod so spring is maintained in a stretched state exerting a pulling force on the handle of the pin retractor and securing the pin retractor operator to the frame of the bogie;

FIG. 12 is a cross sectional view (similar to FIG. 7) of the pin retractor operator of FIG. 10 after the pins have been retracted, so that spring continues to provide pull the pin retractor handle and hold the pin retractor operator against the frame of the bogie so that the trailer bed may be repositioned over the bogie while the pin retractor operator is attached and unattended;

FIG. 13 is a partial cross sectional view (similar to FIGS. 5 and 10) of a third embodiment of a pin retractor operator in accordance with the present invention showing a threaded rod acting as tensioner in the pin retractor operator;

FIG. 14 is a partial cross sectional view (similar to FIGS. 6 and 11) of the pin retractor operator of FIG. 13 showing the ratcheting effect of a rod engager mounted on the case and the threaded rod as the threaded rod is moved to stretch the spring from its equilibrium length to exert a pulling force on the pin retractor handle;

FIG. 15 is a partial cross sectional view of the pin retractor operator of FIG. 13 after the tensioner has been pulled as far as the user is able partially stretching the spring of the pin retractor operator from its equilibrium length to exert a pulling force on the handle of the pin retractor which may be insufficient to retract the pins, FIG. 16 is a partial cross sectional view of the pin retractor operator of FIG. 13 illustrating rotation of the threaded rod to increase the displacement of the spring of the pin retractor operator from its equilibrium position and apply a greater pulling force upon the handle of the pin retractor than was applied when the pin retractor operator was in the state represented in FIG. 15;

FIG. 17 is a partial cross sectional view (similar to FIGS. 7 and 12) of the pin retractor operator of FIG. 13 connected to a handle of a pin retractor after the pins have been retracted so that the trailer bed may be repositioned over the bogie while the pin retractor operator is unattended.

FIG. 25 is a partial cross sectional view (similar to FIGS. 5, 10, and 13) of a fourth embodiment of a pin retractor operator attached to the frame of the bogie with the handle of the pin retractor received in the handle engager prior to a threaded tensioner being rotated within a screw block to the stretch spring;

FIG. 26 is a partial cross sectional view (similar to FIGS. 6, 11, and 16) of the pin retractor operator of FIG. 25 after the tensioner has been screwed out to stretch the spring so that a force is exerted against the handle of the pin retractor prior to retraction of the pins;

FIG. 27 is a partial cross sectional view (similar to FIGS. 7, 12 and 17) of the pin retractor operator of FIG. 25 attached to the frame of the bogie after the handle has moved so that the trailer bed may be repositioned over the bogie while the pin retractor operator is unattended;

FIG. 32 is a partial sectional view of a fifth embodiment of a pin retractor operator of the present invention in a storage position showing a tube open on the left end and closed on the right end by a cap, a threaded shaft extending through the cap and connected by a swivel connection to a spring having a hook extending through the open end of the tube for connection to the handle of the pin retractor mechanism, a knob extends through the cap with a partial nut attached thereto which is spring biased against the threaded shaft, a longitudinal channel is formed in the tube through which the handle of the pin retractor may pass, and a grip is attached to the exterior end of the shaft to allow a pulling or rotational force to be applied to the shaft;

FIG. 33 is a top view of the tube of FIG. 32 showing inner walls in phantom lines;

FIG. 34 is a side view of the tube of FIG. 33;

FIG. 35 is a cross-sectional view along line 35—35 of FIG. 34 of the tube;

FIG. 52 is a top view of one of the screws securing cap to tube in FIG. 32;

FIG. 53 is a side view of the screw of FIG. 52;

FIG. 54 is a side view of the compression spring urging the partial nut against the threaded shaft in FIG. 32;

FIG. 55 is a view of the compression spring of FIG. 54 in a compressed state;

FIG. 56 is an end view of a roll pin forming a portion of the swivel connector of FIG. 32;

FIG. 57 is a side view of the roll pin of FIG. 56;

FIG. 58 is a partially exploded side view of the threaded shaft and grip of the FIG. 32;

FIG. 59 is a top view of the threaded shaft of FIG. 58;

FIG. 60 is an end view of the grip of FIG. 59;

FIG. 62 is a side view of the partial nut of FIG. 32 which is spring biased against the threaded shaft;

FIG. 63 is a bottom view of the partial nut of FIG. 62 showing a hole for receipt of the end of the knob of FIGS. 32, 46, and 47 and showing the partial threads of the nut designed to receive the modified partial threads of the shaft;

FIG. 64 is a side view of the partial nut of FIG. 62 prior to a clearance cut being made to facilitate ratcheting of the nut over the modified partial threads of the shaft;

FIG. 65 is a side view of the partial nut of FIG. 64 after the clearance cut has been made to facilitate ratcheting of the nut over the modified partial threads of the shaft;

FIG. 68 is an expanded partial sectional view of the partial nut, compression spring, threaded shaft, and cap enclosed in circle 68 in FIG. 32 showing the compression spring biasing the partial nut so that shaft engaging surface engages threaded shaft and showing the partial threads of the partial nut seated in the thread of the shaft so that the driven faces of the partial threads abut the driving face of the thread of the shaft and the back faces of the partial threads abut the back face of the thread of the shaft;

FIG. 69 is a view similar to FIG. 68 showing the back faces of the partial threads slid partially along the back face of the thread of the shaft in response to a force pulling the shaft to the right along the longitudinal axis, and showing that the sliding motion of the back faces urges the partial nut upwardly further compressing the compression spring;

FIG. 70 is a view similar to FIG. 69 showing the back faces of the partial threads slid nearly completely along the back face of the thread of the shaft in response to a force pulling the shaft to the night along the longitudinal axis so that the crests of the partial nut engage the crest of the thread of the shaft and showing that the sliding motion of the back faces has urged the partial nut even farther upwardly further compressing the compression spring;

FIG. 71 is a view similar to FIG. 70 showing the shaft moved slightly more to the right so that the crests of the partial threads no longer engage the crests of the nut, and showing that the compression spring has driven the partial nut downwardly so that the back faces of the partial nut engage the back face of the thread of the shaft but the driven face of the partial threads is displaced from the driving face of the thread;

FIG. 72 is a view similar to FIG. 71 after the axial force on the shaft has been removed showing that the compression spring having driven the partial nut downwardly inducing the back faces of the partial nut to have slid downwardly along the back face of the thread of the shaft until the driven face of the partial nut have engaged the driving face of the thread of the shaft;

FIG. 75 is a partial cross sectional view (similar to FIGS. 6, 11, 16 and 26) of the pin retractor operator of FIG. 74 illustrating rotation of the threaded rod to increase the displacement of the spring of the pin retractor operator from its equilibrium position and apply a greater pulling force upon the handle of the pin retractor than was applied when the pin retractor operator was in the state represented in FIG. 74; and FIG. 76 is a partial cross sectional view (similar to FIGS. 7, 12, 17, and 27) of the pin retractor operator of FIG. 75 connected to a handle of a pin retractor after the pins have been retracted so that the trailer bed may be repositioned over the bogie while the pin retractor operator is unattended.

DETAILED DESCRIPTION OF THE DRAWINGS

Figure 1:
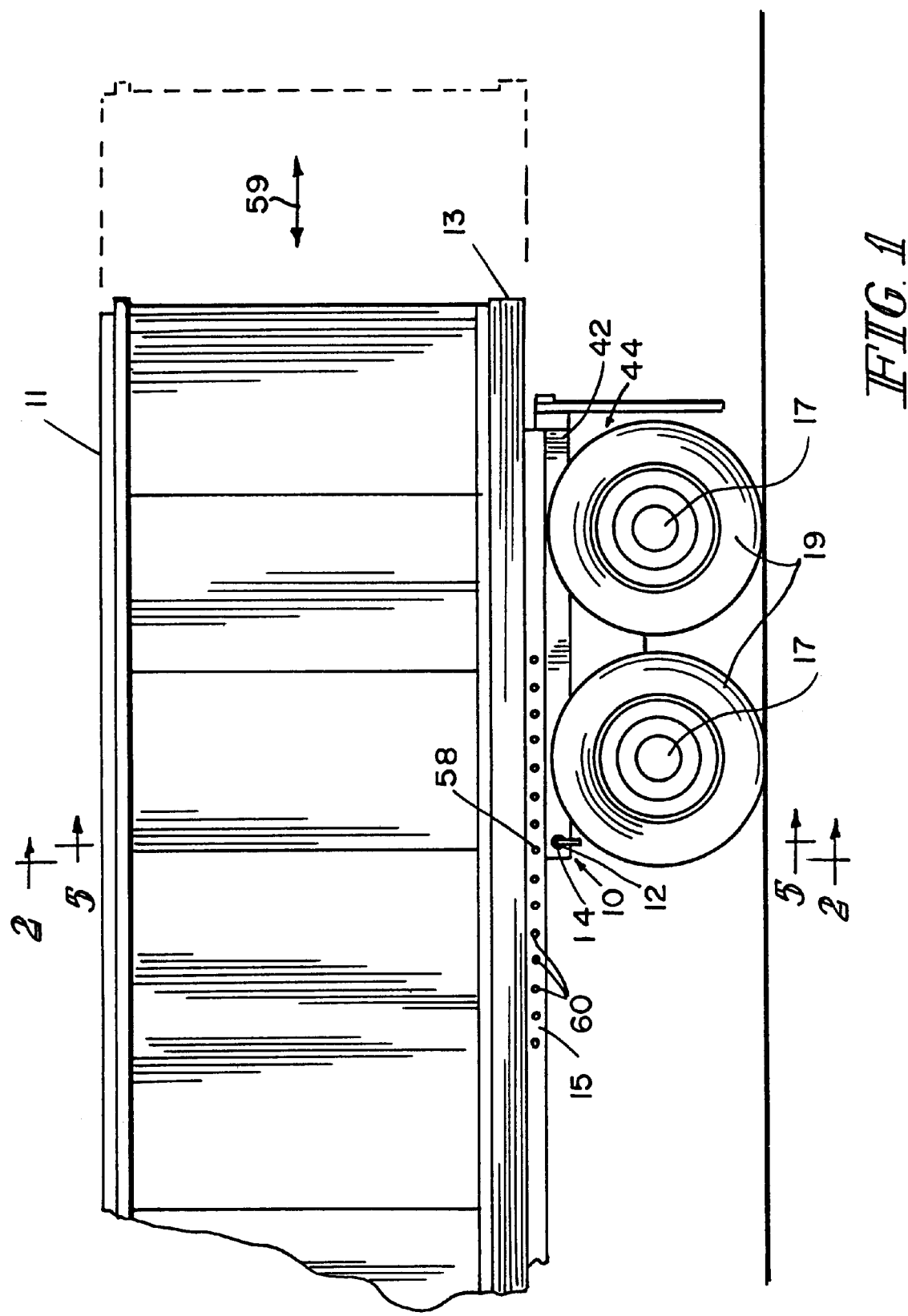
FIG. 1 is a side elevation view of a rear portion of a tractor trailer rig including a trailer bed, a bogie, and a pin retractor operator in accordance with the present invention, the trailer bed includes a bed frame having rails formed to include positioning holes for receiving coupling pins to couple the bed to an underlying bogie, the bogie includes a frame, axles, and wheels, the pin retractor operator is attached to the frame of the bogie and positioned to lie at an 11 o'clock position relative to the left side wheel and showing the trailer bed being movable relative to the bogie between an extended wheelbase position (as shown by the solid lines) and a shortened wheelbase position (as shown by the phantom lines) without interfering with the mounted pin retractor operator when the coupling pins are retracted from the pin holes.

Referring to FIG. 1, a trailer 11 of a semi tractor trailer rig includes a trailer bed 13 which is coupled to and supported above the ground by a tandem-axle bogie 44 including a frame 42 and a wheel 19. Trailer bed 13 is coupled to the bogie 44 by pins 58 which are arranged to extend through frame 42 of bogie 44 and pin holes 60 formed in rails 1 S extending downwardly from the trailer bed 13.

A multi-link pin retractor 14 is attached to frame 42 of bogie 44 and configured to retract pins 58 from pin holes 60 in rails 15 of trailer bed 13 decoupling the trailer bed 13 from the bogie 44 so that the driver can reposition trailer bed 13 relative to the bogie 44 by operating the tractor of the rig to push or pull trailer bed 13 in the direction indicated by double headed arrow 59 in FIG. 1 over stationary bogie 44. Pins 58 are biased to extend pins 58 into pin holes 60 in rails 15 coupled to trailer bed 13 and pin retraction is accomplished by pulling on a handle 12 of pin retractor 14 which extends through frame 42 of bogie 44. Thus, before trailer bed 13 may be repositioned handle 12 of pin retractor 14 must be pulled to retract pins 58 from holes 60 in trailer bed rails 15.

When perfectly aligned, there is some clearance between a pin 58 received in a pin bole 60 and the wall of pin hole 60 so as to allow pin 58 to slide somewhat freely into and out of pin hole 60 in trailer bed rail 15. During operation of the semi tractor trailer rig, pins 58 may become dirty and pin holes 60 and pins 58 may become "misaligned" so that the walls of pin holes 60 may be forced against pins 58 causing pins 58 to become bound within pin holes 60 so that pulling on handle 12 of pin retractor 14 will not induce pin retraction. By locking the trailer brakes and operating the tractor in a forward and backward direction, i.e. rocking trailer bed 13, the alignment of pins 58 and pin hole 60 may be adjusted. At some instant during the rocking of trailer bed 13, pins 58 and pin holes 60 are sufficiently aligned so that pins 58 can be retracted from pin holes 60 if handle 12 of pin retractor 14 is being pulled at that instant.

Since the truck driver cannot be operating the tractor and simultaneously pulling handle 12 of pin retractor 14, retraction of bound pins 58 can either require the aid of another person or a device for pulling on handle 12 of pin retractor 14. If the handle-pulling device being used is not attached to frame 42 of bogie 44, it may interfere with repositioning of trailer bed 13 relative to bogie 44 unless the handle-pulling device is removed after rocking has induced pin retraction and before repositioning trailer bed 13. Removal of the handle-pulling device would require the driver to exit the tractor after rocking of trailer bed 13 has caused pins 58 to be retracted and then return to the tractor to drive the tractor forward or backward to reposition trailer bed 13 over bogie 44. Drivers would welcome a handle-pulling device which could be attached to a trailer 11 to pull on handle 12 of pin retractor 14 and be left in place during both the rocking and repositioning operations.

FIGS. 1–4 show the rear portion of a semi-tractor trailer rig. The rig includes a trailer 11 having a trailer bed 1 3 and downwardly extending rails 15 coupled to trailer bed 13 and formed to define pin holes 60. Trailer 11 also includes a bogie 44 having a frame 42, two axles 17, and wheels 19 mounted on axles 17, and a pin retractor 14 having a handle 12 extending through frame 42. Trailer also includes a coupler 21 including pins 58 for coupling trailer bed 13 to bogie 44 in a fixed position and springs 41 arranged to bias pins 58 to projected positions coupling trailer bed 13 to bogie 44 as shown, for example, in FIG. 2.

Bogie 44 supports trailer bed 13 above the ground and may be secured to trailer bed 13 in multiple positions by pins 58 extending through pin holes 60. When pins 58 are retracted from pin holes 60, trailer bed 13 is free to move relative to bogie 44 between an extended wheelbase position as shown in solid lines in FIG. 1 and a shortened wheelbase position as shown by phantom lines in FIG. 1. Movement of trailer bed 13 with respect to bogie 44 is accomplished by fixing the location of bogie 44 by chocking wheels 19 or locking the bogie brakes and operating tractor to push or pull trailer bed 13 over stationary bogie 44. Movement of trailer bed 13 with respect to bogie 44 facilitates distribution of the weight of a load on trailer bed 13 between wheels 19 of trailer 11 and the wheels of the tractor (not shown).

Figure 2:
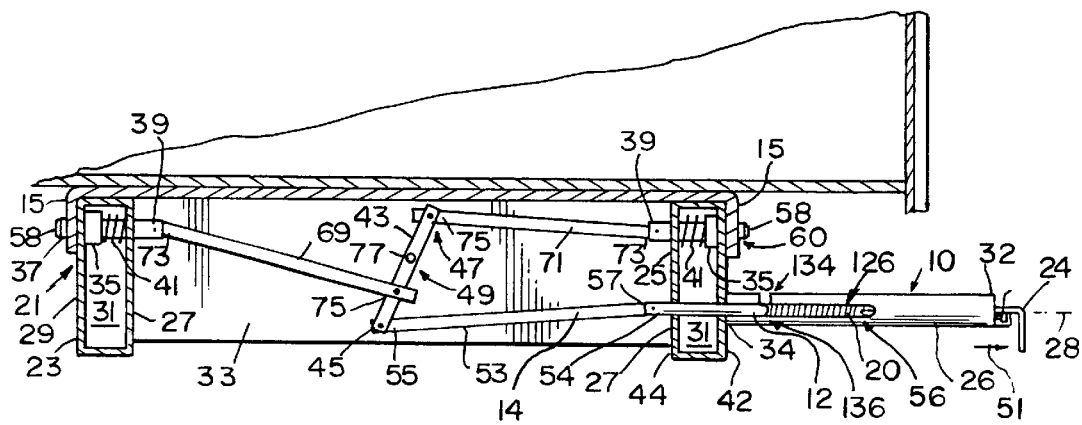
FIGS. 2–4 show in sequence use of a pin retractor operator in accordance with a first embodiment of the present invention to move a pin retractor mounted on a bogie frame to retract two pins into the bogie frame to disengage the trailer bed enabling the trailer bed to be moved relative to the underlying bogie while the pin retractor operator is unattended.
Figure 3:
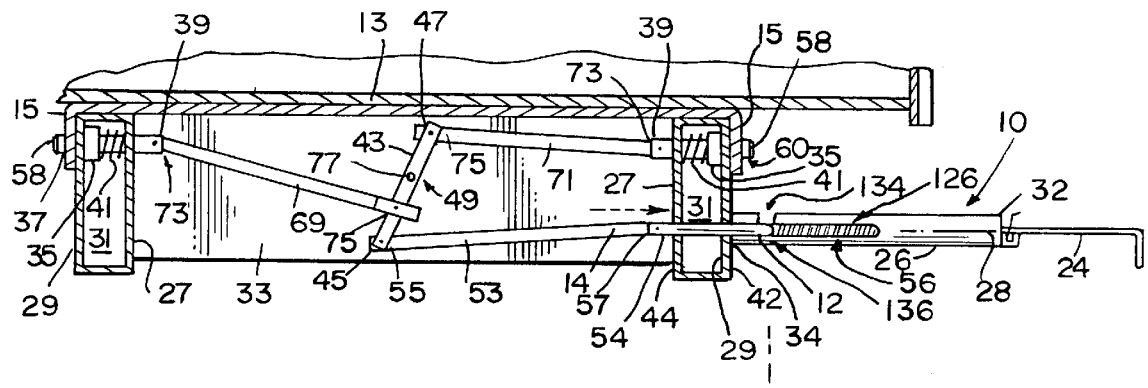
Figure 4:
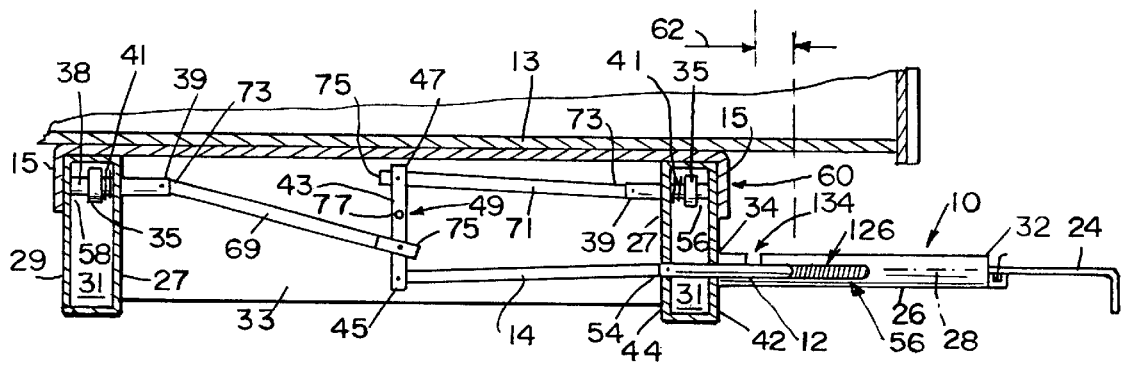

Referring to FIGS. 2–4, frame 42 of bogie 44 includes two spaced-apart double-walled beams 23, 25. Each of beams 23, 25 includes an internal wall 27 and an external wall 29 and is formed to define a cavity 31. Frame 42 of bogie 44 also includes a cross beam 33 extending between double walled beams 23, 25. Each pin 58 includes a circumferentially extending flange 35, a rail-engaging portion 37, and an internal end 39. Pins 58 extend through apertures formed in double walled beams 23, 25 as shown, for example, in FIG. 2. Flange 35 and spring 41 are located within cavity 31 in double walled beams 23, 25. Spring 41 is compressed and positioned to lie between internal wall 27 of double walled beams 23, 25 and flange 3 5 to bias rail-engaging portion 37 of pin 58 normally to extend through one of pin holes 60 to couple bogie 44 to trailer bed 13.

Pin retractor 14 includes a pivot link 43 having a lower end 45, an upper end 47, and a pivot point 49 between lower end 45 and upper end 47, and a retractor link 53 having a first end 55 and a second end 57. Pin retractor 14 also includes handle 12 having a long leg 54 and a short leg 52, left and right pin links 69, 71 each having a pin end 73 and a pivot end 75, and a pivot pin 77.

Pivot link 43 is pivotably coupled by pivot pin 77 to cross beam 33 at pivot point 49 and is pivotably connected near lower end 45 to first end 55 of retractor link 53, between lower end 45 and pivot point 49 to pivot end 75 of left pin link 69, and between pivot point 49 and upper end 47 to pivot end 75 of night pin link 71. Left and right pin links 69, 71 are coupled at pin end 73 to internal ends 39 of pins 58 as is shown, for example, in FIGS. 2–4. Second end 57 of retractor link 53 is attached to long leg 54 of handle 12 which extends through apertures formed in internal wall 27 and external wall 29 of the right double-walled beam 25 of frame 42 so that short leg 52 of handle 12 is accessible to a user.

Handle 12 has a range of motion 62 through which it may be pulled to induce pivot link 43 to pivot about pivot point 49 causing pin links 69, 71 to pull on internal ends 39 of pins 58 to compress biasing springs 41 to retract pins 58 from pin hole 60 as is shown, for example, in FIGS. 3 and 4. Pin retractor 14 can be moved using pin retractor operator 10 to retract simultaneously all of pins 58 from pin holes 60 to facilitate adjustment of trailer bed 13 relative to bogie 44 to enhance load distribution in trailer 11. Pin retractor operator 10 is coupled to handle 12 of pin retractor 14 and to frame 42 of bogie 44 so that pin retractor operator 10 does not interfere with repositioning trailer bed 13 relative to bogie 44.

Pin retractor operator 10 is provided for maintaining a pulling force against handle 12 of pin retractor 14 leaving the truck driver free to drive the tractor to reposition bogie 44 under trailer bed 13. Pin retractor operator 10 includes a handle engager 16, a spring 20 having a handle end 18 and a tensioner end 22, a tensioner 24, a case 26 having a longitudinal axis 28, a frame-engaging end 34, a cap 30, and an enclosed end 32 as shown, for example, in FIGS. 5–7. Handle engager 16 is coupled to handle end 18 of spring 20 which is coupled at tensioner end 22 to tensioner 24.

When tensioner 24 is pulled to stretch spring 20, spring 20 exerts a pulling force on handle engager 16 which transfers this pull to handle 12 received in handle engager 16. When this pulling force is maintained, repositioning bogie 44 under trailer bed 13 may be accomplished by the truck driver acting alone without another person standing next to trailer 11 and pulling manually on handle 12 of pin retractor 14.

Spring 20 and handle engager 16 are disposed within, and free to travel longitudinally with respect to, case 26. Cap 30 is attached to case 26 to form enclosed end 32. Frame-engaging end 34 has opening 36 therethrough providing communication between interior 38 and exterior 40 of case 26. Frame-engaging end 34 and opening 36 are spaced apart from enclosed end 32 with longitudinal axis 28 extending therebetween. Frame-engaging end 34 is designed and arranged to engage frame 42 of bogie 44 frictionally so that pin retractor operator 10 may be secured to frame 42 of bogie 44 and simultaneously provide a pulling force on handle 12 of pin retractor 14.

Tensioner 24 extends through cap 30 and is partially disposed within interior 38 of case 26 and is attached for longitudinal movement relative to case 26. Tensioner 24 has an internal end 46 inside case 26 and an external end 48 outside of case 26. When tensioner 24 is pulled to stretch spring 20 and then held in place relative to cap 30, tension in spring 20 is transferred through tensioner 26, cap 30, and case 26 so frame-engaging end 34 exerts a normal force on frame 42 of bogie 44 equal to the pull exerted on handle 12 by handle engager 16 to facilitate retraction of pins 58 so that trailer bed 13 is free to move relative to bogie 44. Since pin retractor operator 10 pushes against frame 42 of bogie 44 while pulling on handle 12 of pin retractor 14 which is attached to bogie 44, pin retractor operator 10 is secured to bogie 44 and may be left unattended while driver repositions trailer bed 13 over bogie 44.

A directional movement regulator 50 is attached to cap 30 and is capable of holding tensioner 24 in place relative to cap 30 after spring 20 has been stretched. To facilitate removal of pin retractor operator 10 from bogie 44 it is desirable to be able to release the tension in spring 20 after it has been stretched, therefore directional movement regulator 50 selectively regulates movement of tensioner 24 with respect to cap 30 and case 26 and is capable of assuming two "states". In a first state, directional movement regulator 50 allows bidirectional longitudinal movement of tensioner 24 with respect to cap 30 and case 26 so that spring 20 is stretched while tensioner 24 is being pulled and spring 20 returns to its equilibrium length 61 when the pulling stops. In a second state, directional movement regulator 50 only allows free longitudinal movement of tensioner 24 in the direction which will increase the stretch of spring 20 but restricts tensioner 24 from moving in the direction which will decrease the stretch of spring 20.

For purposes of this disclosure, a "stretching force" is a force that would stretch spring 20 if movement of handle end 18 is restricted by the presence of handle 12 in handle engager 16. In pin retractor operator 10, a stretching force is exerted by a pull on external end 48 of tensioner 24 directed away from cap 30 in the direction of arrow 67 shown in FIG. 7. In the second state, directional movement regulator 50 limits movement in the direction in which a free tensioner 24 would move while releasing tension in spring 20. For purposes of this disclosure, a "tension-releasing force" is a force directed in the direction of the force exerted by a pull on internal end 26 of tensioner 16 directed away from cap 30.

When movement of handle engager 16 within case 26 is blocked, as through engagement with handle 12 of pin retractor 14, and frame-engaging end 34 is abutting frame 42 of bogie 44, tensioner 24 can be subjected to a stretching force to stretch spring 20. Upon release of tensioner 24, spring 20 remains stretched when directional movement regulator 50 is in the second state. Spring tension is translated through tensioner 24, directional movement regulator 50, cap 30, and case 26 causing frame-engaging end 34 to exert a normal force on frame 42 of bogie 44. An oppositely directed force of equal magnitude is exerted on handle 12 by handle engager 16. The oppositely directed forces secure pin retractor operator 10 to frame 42 of bogie 44 allowing the truck driver to leave pin retractor operator 10 unattended while the tractor is operated. If the truck driver wishes to release the tension in spring 20, for instance to remove pin retractor operator 10 from frame 42 of bogie 44, directional movement regulator 50 is placed in its first state so that tensioner 24 may move relatively freely with respect to case 26 allowing spring 20 to return to its equilibrium length 61.

As shown in FIGS. 2–4, long leg 54 of handle 12 extends through frame 42 of bogie 44 and is connected to retractor link 53 which is connected to pivot link 43 which is connected by pin links 69, 71 to each pin 58. Short leg 52 of handle 12 lies to the outside of frame 42 and provides convenient access to the truck driver. Handle 12 of pin retractor 14 is L-shaped in the illustrated embodiment, with short leg 52 of handle 12 being approximately as long as the width of a hand so that the truck driver can grasp short leg 52 to apply a force in the direction of arrow 67 in FIG. 7 along the axis of long leg 54. Handle 12 has a range of motion 62 through which it must move to fully retract pins 58 from pinholes 60 in rails 15. Handle engager 16 engages handle 12 of retractor 14 so that spring 20 can induce movement of handle 12 though its range of motion 62 as shown, for example, in FIGS. 3, 4, 6, and 7.

Case 26 is designed to ensure that case 26 does not inhibit movement of handle 12 through its range of motion 62. Providing a case 26 of sufficient diameter to receive the entire length of short leg 52 of handle 12 is undesirable, therefore a longitudinal slot 56 is provided in case 26 so that only a portion of handle 12 must be received in case 26 to allow case 26 to accommodate handle movement as shown, for example, in FIGS. 24 and 9. Case 26 may have two longitudinal slots 126, 127, as shown for example in FIG. 29.

In use, short leg 52 of handle 12 is received in handle engager 16 of pin retractor operator 10. Case 26, which is movable relative to longitudinal axis of tensioner 24 is moved toward frame 42 of bogie 44 while a stretching force is maintained on tensioner 24 so that handle 12 remains seated in handle engager 16. Handle engager 16 moves within case 26 and spring 20 remains virtually unstretched until frame-engaging end 34 of case 26 contacts frame 42 of bogie 44 as in FIGS. 2 and 5. During this initial movement, handle 12 may slide within longitudinal slot 56 in case 26, while long leg 54 of handle 12 rides along exterior side wall 128 of case 26 as shown, for example, in FIGS. 2 and 9.

After frame-engaging end 34 of case 26 contacts frame 42, if pins 58 are bound within pin holes 60, further extension of tensioner 24 causes spring 20 to be stretched and frame-engaging end 34 of case 26 to be pressed against frame 42 with a force equal to the tension in spring 20. An oppositely directed force is exerted against handle 12 to induce movement of handle 12 when pins 58 are no longer bound within pin holes 60.

To ensure that pins 58 will be retracted when they are no longer bound within pin holes 60, spring 20 is tensioned to approximately one hundred-fifty pounds force (150 lbf). Occasionally, the application of one hundred-fifty pounds of force (150 lbf) to handle 12 will be sufficient, without rocking trailer bed 13, to retract pins 58 immediately. If this occurs, pin retractor operator 10 may be left in place while the truck driver moves the tractor and trailer bed 13 with respect to bogie 44 so as to redistribute the load between the various wheels. If pins 58 do not retract upon] application of tension to handle 12, the forces between frame-engaging end 34 and frame 42 and handle 12 and handle engager 16 are sufficient to secure pin retractor operator 10 to frame 42 so that the driver is free to rock trailer bed 13 to induce pin retraction and then reposition trailer bed 13 with respect to bogie 44 while leaving pin retractor operator 10 unattended.

Spring 20 is selected with a spring constant such that it may be displaced from its equilibrium length 61 by a distance 64 greater than range of motion 62 of handle 12 when sufficient tension is present in spring 20 to cause release of pins 58. Spring 20 is preferably selected with a spring constant such that the displacement 64 of spring 20 from equilibrium required to provide sufficient tension to initiate movement of handle 12 and retraction of pins 58 is greater than range of motion 62 of handle 12 by a sufficient amount that spring 20 will remain stretched after pin retraction as shown, for example, in FIGS. 6–7. After pin retraction, handle 12 is in an extended position and short leg 52 is received in longitudinal slot 56 so that handle 12 provides some support to pin retractor operator 10 so that less force is required to secure it to the bogie 44. By selecting spring 20 according to these criteria, spring 20 will continue to supply a force for pressing case 26 to frame 42 of bogie 44 after pins 58 have been retracted as shown in FIG. 7 allowing the truck driver to remain in the cab of the tractor after pin retraction has occurred and immediately reposition trailer bed 13 relative to bogie 44.

Upon retraction of pins 58, handle 12 will move in the direction of arrow 67 in FIG. 7 from its initial position, as shown in FIGS. 2, 5, 10, 13, 25 and 73, through its range of motion 62 to a final position as shown in FIGS. 4, 7, 12, 17, 27 and 76. A typical range of motion 62 for handle 12 is between ten (10) to twelve (12) inches. The movement of handle 12 will cause a reduced displacement 65 of spring 20 from its equilibrium length 61 causing the tension within spring 20 to be reduced proportionally. Thus, after retraction of pins 58, pin retractor operator 10 will continue to be secured to frame 42 of bogie 44 although spring 20 will be tensioned to a lesser extent than prior to pin release as a result of its reduced displacement 65 from its equilibrium length 61. Spring 20 being under lower tension eases the effort required to release the tension in spring 20 allowing pin retractor operator 10 to be removed from the vehicle.

Maintenance of some tension in spring 20 allows the driver to drive the truck to position trailer bed 13 relative to bogie 44 in the desired location under trailer to distribute the weight of the load properly. Prior to "rocking" trailer bed 13 back and forth, spring 20 is stretched to its full displacement 64. At some time during the rocking of trailer bed 13, pins 58 become unbound and are retracted, handle 12 slides within longitudinal slots 56 and displacement 65 of spring 20 from its equilibrium length 61 is reduced by range of motion 62 of handle 12. Even after pin retraction some tension is maintained in spring 20 to keep pin retractor operator 10 secured to frame 42 of bogie 44. If pin retractor operator 10 were attached to trailer bed 13 rather than to frame 42 of bogie 44, removal of pin retractor operator 10 would be required prior to driving trailer bed 13 over bogie 44 to prevent over-extension of spring 20 or damage to trailer bed 13. Therefore, the driver does not need to exit the tractor cab to remove the pin retractor operator 10 immediately after pin retraction but prior to positioning bogie 44 under trailer bed 13 properly.

Pin retractor operator 10 is shown in greater detail in FIGS. 5–7. Handle engager 16 includes hook 66 formed from handle end 18 of the spring material which is coiled to form spring 20 and is coupled to spring 20 by non-coiled portion 68 of the spring material. Hook 66 has open-side 70 to allow handle 12 to be received in hook 66. Tensioner end 22 of spring 20 is formed into a rod-engaging hook 72 which extends through spring attachment bole 74 near internal end 46 of smooth rod 76 of tensioner 24 to couple smooth rod 76 to spring 20.

An anti-rotation plate 78 is attached to smooth rod 76 between spring attachment hole 74 and external end 48 near internal end 46 of smooth rod 76 as shown, for example, in FIGS. 5–7. Anti-rotation plate 78 is formed to include a central bore 79 having a diameter 80 slightly less than the diameter 104 of the smooth rod 76, compression ears 81 defining a compression void 83 therebetween, a first arcuate surface 85 and a second arcuate surface 87 spaced apart from the first arcuate surface 85 by a distance 89 approximately equal to the inside diameter 91 of case 26. Second arcuate surface 87 is formed to include a groove 93. Smooth rod 76 extends through central bore 79. Fastener 129 extends between ears 81 across compression void 83 and squeezes ears 81 together to secure anti-rotation plate 78 to smooth rod 76 as shown for example in FIG. 30.

Figure 8:
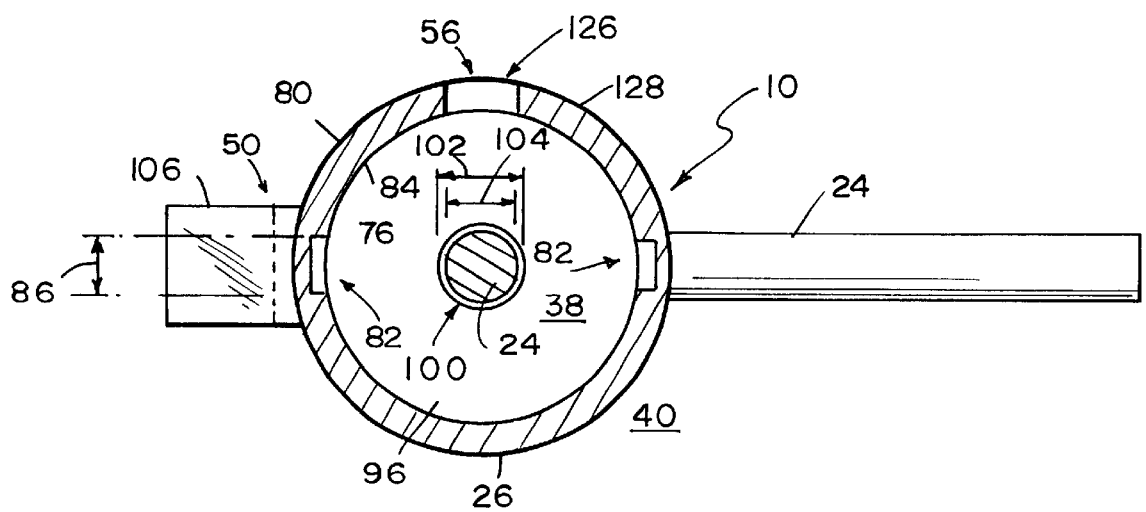
FIG. 8 is a cross sectional view of a second embodiment of a pin retractor operator taken along line 8—8 of FIG. 10 (with the spring removed) showing longitudinal channels and a longitudinal slot formed into the case of the pin retractor operator.

In the illustrated embodiments, case 26 is substantially cylindrical and includes a longitudinal rib 115 as shown, for example, in FIG. 8, formed, extruded or attached to its interior side walls 84. Groove 93 and longitudinal rib 115 are sized and arranged so that longitudinal rib is received in groove 93 in anti-rotation plate 78 to prohibit rotation of smooth rod 76 and spring 20, as shown for example in FIG. 8. Thus, hook 66 is maintained in a specific alignment within case 26 with open-side 70 facing lateral opening 134 as shown, for example, in FIGS. 5–6. The alignment of the open-side 70 of the hook 66 facilitates receipt of handle 12 of pin retractor 14 within hook 66.

Cap 30 has internal surface 96 and external surface 98 and is formed to include centrally located smooth bore 100 extending between internal surface 96 and external surface 98 providing communication between interior 38 and exterior 40 of case 26. Smooth bore 100 has a diameter 102 slightly greater than diameter 104 of smooth rod 76 which extends therethrough as shown in FIG. 8.

Adjacent to the external opening of smooth bore 100 is a binding regulator 106 embodiment of directional movement regulator 50 that acts like a latch to regulate movement of smooth rod 76 along longitudinal axis 28 of case 26. Binding regulator 106 includes binding plate 108 having pivot end 110 formed to include binding hole 122 and a release end 112, mounting bracket 116, and compressed spring 124. Pivot end 110 rests on, and pivots about, lip 114 formed in mounting bracket 116 attached to cap 30. Mounting bracket 116 includes flange 118 formed with hole 120 therethrough through which smooth rod 76 slides freely. Smooth rod 76 extends through binding hole 122 in binding plate 108. Compressed spring 124 envelops smooth rod 76 and is compressed between flange 118 and binding plate 108 to bias binding plate 108 in a position wherein smooth rod 76 will bind in binding hole 122 if a tension-releasing force is applied to smooth rod 76.

Figure 29:
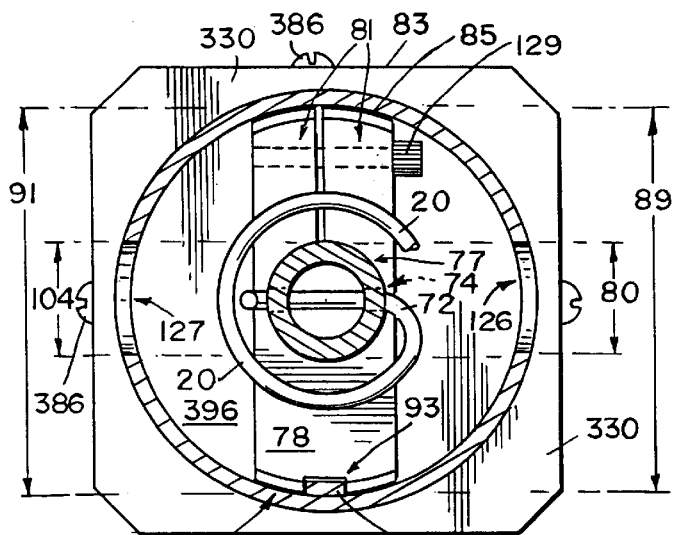
FIG. 29 is a cross sectional view along lines 29—29 of FIG. 5 showing a longitudinal rib extending from the internal wall of the case of the pin retractor operator and showing the rib received in a groove in an anti-rotation plate attached to the tensioner to prevent rotation of the tensioner and the spring.

Another embodiment of directional movement regulator 50 similar to binding regulator 106 is shown in FIG. 29. Adjacent to the external opening of smooth bore 100 is binding regulator 105 that acts like a latch to regulate movement of smooth rod 76 along longitudinal axis 28 of case 26. Binding regulator 105 includes a pivoted binding plate 107, fulcrum 111, first free floating binding plate 101, second free floating binding plate 103, mounting bracket 117, and compressed spring 125.

Pivoting binding plate 107 includes a release end 113 and a binding end 109 formed to include a binding bold 123. Binding end 109 of pivoted binding plate 107 is separated from release end 113 by fulcrum 111. Mounting bracket 117 includes flange 119 formed with hole 121 therethrough through which smooth rod 76 slides freely. First free floating binding plate 101 and second free floating binding plate 103 are identical and are formed to include binding hole 99. First free floating binding plate 101 and second free floating binding plate 103 are stacked on top of pivoting binding plate so that binding holes 99 and 123 substantially align. First free floating binding plate 101 and second free floating binding plate 103 are free to move relatively with respect to each other and to pivoting binding plate 107 in the direction of arrows 95 and 97 in FIG. 31.

Smooth rod 76 extends through binding hole 123 in binding plate 107 and through binding holes 99 in first and second free floating binding plates 101, 103. Compressed spring 125 envelops smooth rod 76 and is compressed between flange 119 and second free floating binding plate 103 to bias binding plate 107 and first and second free floating binding plates 101, 103 in a position wherein smooth rod 76 will bind in binding hole 123 and/or binding hole 99 if a tension-releasing force is applied to smooth rod 76. By this arrangement of binding plates 101, 103, 107 six possible points of contact are available to bind smooth rod 76 and prevent movement in the direction of a tension-releasing force.

Figure 30:
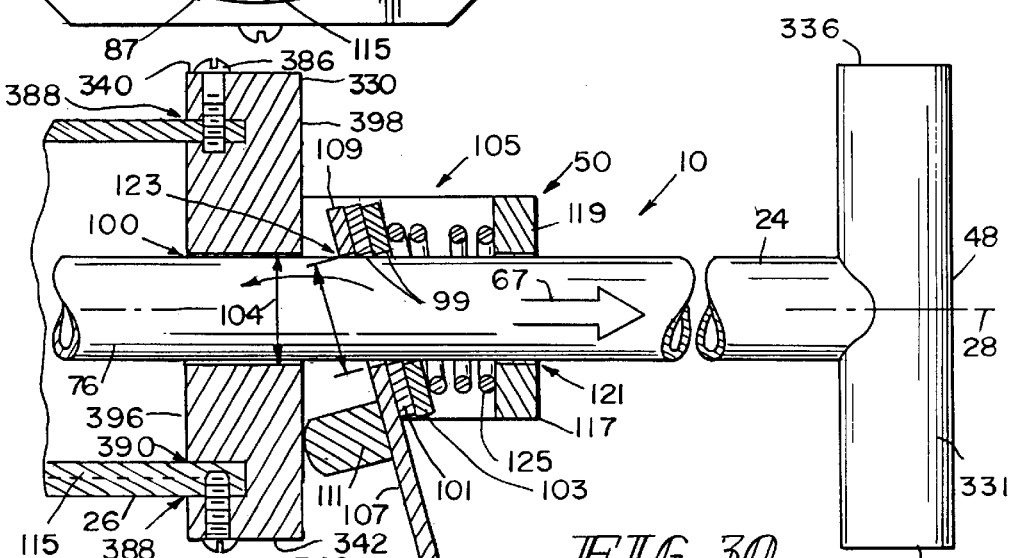
FIG. 30 is a partial cross sectional view of an alternative embodiment of the cap, tensioner, and movement regulator used with a smooth rod tensioner showing the movement regulator in a state in which the tensioner is bound within the movement regulator preventing movement of the tensioner in the direction toward the left side of the drawing but in which the tensioner is free to move toward the right side of the drawing if a force is applied in that direction and also showing a T-handle attached to the exterior end of the tensioner.
Figure 31:
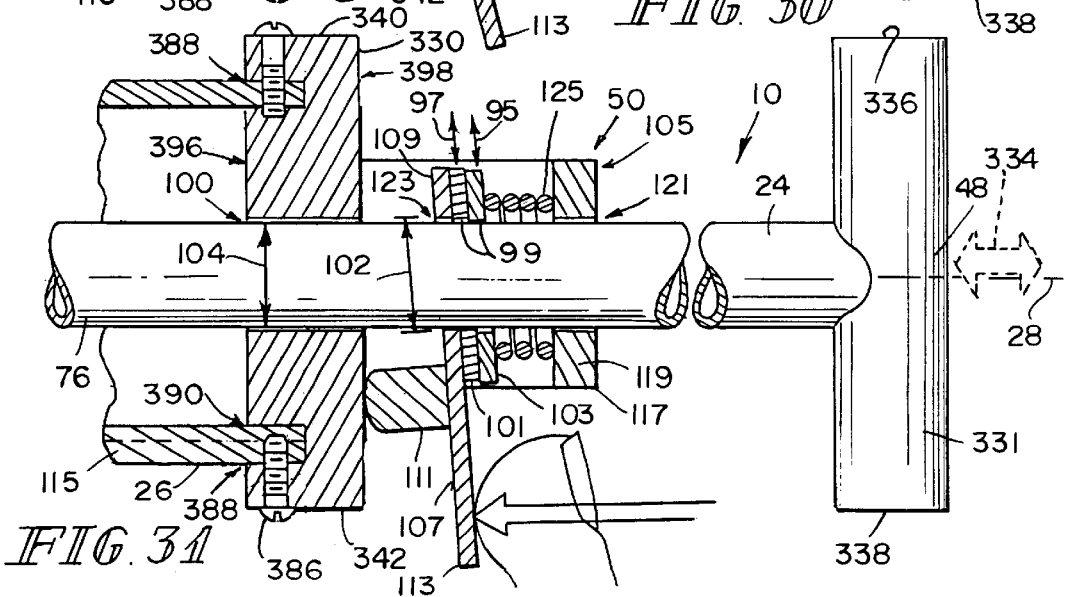
FIG. 31 is a view similar to FIG. 30 showing the movement regulator in a state in which the tensioner is not bound within the movement regulator and is therefore free to move toward the left or the night of the drawing.

FIGS. 29–31 also illustrate an additional embodiment of cap 330 and handgrip or T-handle 331. Cap 330 includes an internal surface 396 and an external surface 398 having a centrally located smooth bore 100 extending therebetween. A concentric groove 388 is formed in internal surface 396 of cap 330 in which case 26 is received as shown, for example, in FIGS. 30–31. A notch 390 communicating with groove 388 is formed in cap 330 to receive rib 115. Cap 330 is secured to case 26 by fasteners 386 as shown in FIGS. 29–31.

Attached to external end 48 of smooth rod 76 acting as tensioner 24 is a T-handle 331. As shown, for example, in FIGS. 30 and 31, T-handle 331 is provided to allow a user to apply forces to tensioner 24 in the directions of double headed arrow 334. T-handle 331 is sized so that spaced apart ends 332, 333 of T-handle 331 do not extend radially beyond side walls 340, 342 of cap 330, to aid in storage of pin retractor operator 10.

In binding regulators 105, 106 binding occurs as a result of misalignment of smooth rod 76 with the walls of binding holes 122, 123 and 99. Compressed spring 124, 125 induces such misalignment. When a tension-releasing force is applied to smooth rod 76, friction between smooth rod 76 and the walls of binding bole 122, 123, 99 acts to increase the misalignment of smooth rod 76 and the walls of binding hole 122, 123, 99 thereby increasing the binding effect. When a stretching force is applied to smooth rod 76, friction between smooth rod 76 and the walls of binding hole 122, 123, 99 acts in the direction opposite to the force exerted by compressed spring 124, 125 allowing smooth rod 76 and the walls of binding hole 122, 123, 99 to align sufficiently for smooth rod 76 to slide through binding holes 122, 123, 99. Under this normal biasing, smooth rod 76 moves relatively freely when subjected to a tensioning force. Thus binding regulators 105, 106 are normally biased in the second state. Binding regulator 106 may be placed in the first state, wherein it does not prohibit bidirectional movement of smooth rod 76, by lifting on release end 112 of binding plate 108 so that the walls of the binding hole 122 align with smooth rod 76. Likewise, binding regulator 105 may be placed in the first state, wherein it does not prohibit bidirectional movement of smooth rod 76, by pushing on release end 113 of binding plate 107 so that the walls of the binding holes 99, 123 align with smooth rod 76.

Pin retractor operator 10 has two longitudinal slots 126, 127 extending between interior side wall 84 and exterior side wall 128 of case 26 providing communication between interior 38 and exterior 40 of case 26 as shown, for example, in FIG. 29. Longitudinal slots 126, 127 are positioned approximately ninety degrees (90°) from longitudinal rib 115. Longitudinal slots 126, 127 have a width 130 greater than diameter 132 of the material forming handle 12 as shown in FIG. 29 so short leg 52 of handle 12 may slide freely within longitudinal slots 126, 127.

Lateral opening 134 is provided near open end 36 of case 26 and intersects with bottom end 136 of longitudinal slots 126, 127 allowing for easy insertion of handle 12 of pin retractor 14 into hook 66. Since longitudinal rib 115 is received in groove 93 of anti-rotation plate 78 and rod-engaging hook 72 is received in spring attachment hole 74 of smooth rod 76, open-side 70 of hook 66 is oriented toward lateral opening 134 as shown in FIGS. 5 and 7. Short leg 52 of handle 12 is displaced from frame 42 of bogie 44 by a distance 138 sufficient to allow a truck driver to grasp handle 12 without the driver's hand becoming pinched between frame 42 and handle 12. Therefore, lateral opening 134 is displaced from frame-engaging end 34 by a distance 140 approximately equal to displacement 138 of short leg 52 of handle 12 from frame 42 as shown in FIGS. 5 and 6.

In use, pin retractor operator 10 is initially positioned with longitudinal axis 28 substantially perpendicular to external wall 29 of frame 42 of bogie 44 either above or below short leg 52 and adjacent to long leg 54 of handle 12 of pin retractor 14. Then pin retractor operator 10 is either lowered or raised until short leg 52 of handle 12 passes through lateral opening 134 and open-side 70 of hook 66. A stretching force in the direction of arrow 51 in FIG. 2 is applied to smooth rod 76 while case 26 is pushed into engagement with frame 42 as shown, for example, in FIGS. 2 and 5.

During this initial phase, short leg 52 of handle 12 may or may not be pulled into longitudinal slots 126, 127. For instance, if short leg 52 of handle 12 is displaced from frame 42 by a distance greater than the minimum displacement 138 referred to in the previous paragraph, then short leg 52 of handle 12 will likely be pulled into longitudinal slots 126, 127 during this initial phase. Upon engagement of frame-engaging end 34 of case 26 with frame 42, further stretching force applied in the direction of arrow 51 in FIG. 2 to smooth rod 76 will increase displacement 64 of spring 20 from its equilibrium length 61 causing tension to be stored in spring 20 as shown, for example, in FIGS. 3 and 6. When pins 58 are retracted, short leg 52 of handle 12 rides within longitudinal slot 126 as handle 12 is pulled by the tension in spring 20 as shown, for example, in FIGS. 4 and 7. Long leg 54 of handle 12 rides along exterior wall 128 of pin retractor operator 10.

It is envisioned that drivers may prefer alternative methods for securing pin retractor operator 10 to handle 12. For instance, if short leg 52 of handle 12 has been deformed, case 26 may be positioned with longitudinal axis 28 substantially parallel to external wall 29 of frame 42 of bogie 44 with longitudinal slot 126 oriented to open toward frame 42. Then short leg 52 of handle 12 of pin retractor 14 may be inserted into opening 36 in frame-engaging end 34 of case 20 with short leg 52 positioned on the side of hook 66 facing the side of case 26 opposite slot 126. When the end of short leg 52 has been inserted into case 26 so far that it extends beyond hook 66, case 26 may be rotated so that short leg 52 is captured within hook 66 and extends through slot 126. Long leg 54 of handle 12 will then be partially positioned within case 26 on the side of spring 20 opposite longitudinal slot 126. If the deformity of handle 12 tends to cause handle 12 to slide out of hook 66, long leg 54 will contact interior wall 84 of case 26 opposite slot 126 to prevent handle 12 from completely sliding out of hook 66. This method of attachment of pin retractor operator 10 is not always available because wheels 119 of bogie 44 may interfere with rotation of case 26 from a position wherein longitudinal axis 28 is substantially perpendicular to frame 42 to a position wherein longitudinal axis 28 is substantially perpendicular to frame 42.

A second embodiment of pin retractor operator is shown, for example, in FIGS. 8–12. Pin retractor operator 150 includes a tensioner 24 having a semi-toothed rod 152 formed to include a longitudinal row of teeth 154, a toothed side 156, and a smooth side 158. Directional movement regulator 50 of pin retractor operator 150 includes a ratchet regulator 160. Pin retractor operator 150 includes a single longitudinal slot 56 (FIGS. and 8–9) in case 146 so that only a portion of handle 12 must be received in case 146 to allow case 146 to accommodate handle movement as shown, for example, in FIG. 9.

In the illustrated embodiment, case 146 is cylindrical and includes diametrically opposed longitudinal internal channels 82 as shown, for example, in FIG. 8, formed, extruded or machined in its interior side walls 84. Internal channels 82 have a width 86 greater than diameter 88 of spring material forming spring 142 and integral hook 144 as shown, for example, in FIG. 9.

Hook 144 is formed to have a channel-following kink 90 disposed on open-side 70 of hook 144 and channel-following member 92 on closed-side 94 of hook 144. Channel-following kink 90 and channel-following member 92 are positioned within diametrically opposed longitudinal internal channels 82 as shown, for example, in FIGS. 9 and 10–12. Thus, hook 144 is designed to maintain a specific alignment of open-side 70 within the case 146 and to not rotate with respect to case 146, thereby prohibiting spring 142 from rotating with respect to case 146. The alignment of the open-side 70 of the hook 144 facilitates receipt of handle 12 of pin retractor 14 within hook 144. While prevention of spring rotation is a convenience in all embodiments of the pin retractor operator it is particularly useful in alternative embodiments described herein which contain tensioners 24 which provide tension to spring 20 through rotation of tensioner 24.

Figure 9:
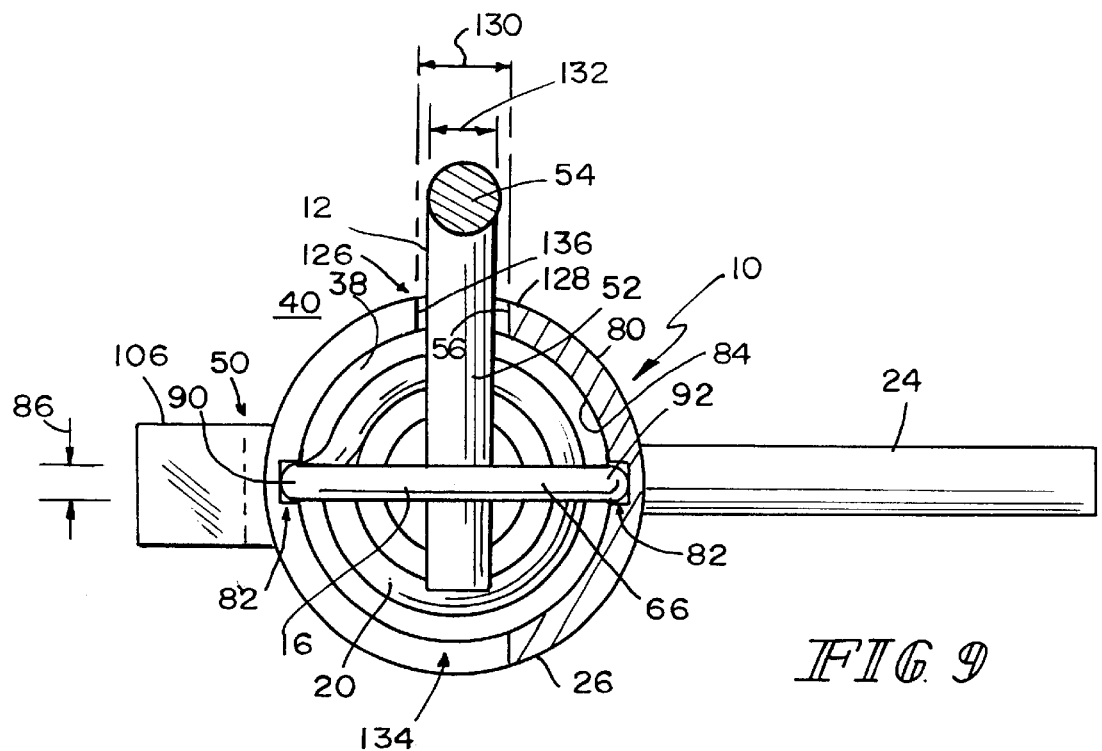
FIG. 9 is a cross sectional view of the pin retractor operator taken along line 9—9 of FIG. 10 showing engagement of portions of the handle engager in the longitudinal channels formed in the case to orient the handle engager properly as it moves within the case and also showing the pin retractor handle received in the longitudinal slot.

Pin retractor operator 150 has single longitudinal slot 56 extending between interior side wall 84 and exterior side wall 128 of case 146 providing communication between interior 38 and exterior 40 of case 146 as shown, for example, in FIGS. 8 and 9. Longitudinal slot 56 is positioned approximately ninety degrees (90°) from internal channels 82. Longitudinal slot 56 has a width 130 greater than diameter 132 of the material forming handle 12 as shown in FIG. 9 so short leg 52 of handle 12 may slide freely within longitudinal slot 56.

Lateral opening 134 is provided near open end 36 of case 146 and intersects with bottom end 136 of longitudinal slot 56 allowing for easy insertion of handle 12 of pin retractor 14 into hook 144. Since channel-following kink 90 and channel-following member 92 are received in internal channels 82, open-side 70 of hook 144 is oriented toward lateral opening 134 as shown in FIGS. 10–12.

Ratchet regulator 160 includes a pawl 162 having a pawl arm 166 and a release arm 168, a spring 170, and a fulcrum 164. Ratchet regulator 160 relies on rotation of semi-toothed rod 152 by approximately half a turn to assume first state, wherein pawl arm 166 engages smooth side 158 of semi-toothed rod 152, as shown by phantom lines in FIG. 12, and second state, wherein pawl arm 166 engages toothed side 156 of semi-toothed rod 152, as shown, for example, in solid lines in FIGS. 10–12.

Pawl 162 is pivotably mounted to fulcrum 164 attached to external surface 98 of cap 30 so that pawl 162 and fulcrum 164 form a first-class lever. That portion of pawl 162 on the side of fulcrum 164 nearest smooth bore 100 forms pawl arm 166 while the portion on the opposite side of fulcrum 164 forms pawl release arm 168.

Spring 170 biases pawl 162 in a position so that pawl arm 166 is urged into engagement with semi-toothed rod 152. Semi-toothed rod 152 is rotatable within smooth bore 1100 in direction 181 about longitudinal axis 28 as shown in FIG. 12, between a first position in which smooth side 158 of semi-toothed rod 152 is engaged by pawl arm 166 and a second position wherein toothed side 156 of semi-toothed rod 152 is engaged by pawl arm 166. When semi-toothed rod 152 is in the second position, pawl arm 166 rides up inclines 172 of each tooth 154 of semi-toothed rod 152 until it falls into the next tooth aperture 174 when semi-toothed rod 152 is subjected to a stretching force in direction 153.

When a tension-releasing force is exerted on semi-toothed rod 152 while it is in the second position, pawl arm 166 rides down incline 172 of the current tooth 154 within which pawl arm 166 is situated until it contacts radial wall 176 of tooth 154 prohibiting further motion of semi-toothed rod 152. Thus when semi-toothed rod 152 is in second position, ratchet regulator 160 is in the second state. When semi-toothed rod 152 is in the first position, pawl 162 slides along smooth side 158 of semi-toothed rod 152 allowing relatively free bidirectional movement, as shown by arrow 151 in FIG. 12, of semi-toothed rod 152. An alternative method of placing ratchet regulator 160 into the first state is to push on pawl release arm 168 to disengage pawl arm 168 from semi-toothed rod 152.

Pin retractor operator 10 and pin retractor operator 150 are used in substantially the same fashion. When pin retractor operator 150 is attached to bogie 44, it is important to place semi-toothed rod 152 in the second position so that pawl arm 166 engages toothed side 156 prior to releasing the pulling force applied to semi-toothed rod 152 to stretch spring 142. Once in this position any tension stored in spring 142 will be retained until pins 58 are retracted or the driver elects to release the tension by configuring ratchet regulator 160 in the first position.

A third embodiment of pin retractor operator is shown for example in FIGS. 13–24. Pin retractor operator 180 includes a case 26 as previously described except case 26 has two diametrically opposed longitudinal slots 182, 184 formed therein and no internal channels. Diametrically opposed longitudinal slots 182, 184 are connected by lateral slot 186 extending therebetween as shown, for example, in FIG. 24. Diametrically opposed longitudinal slots 182, 184 and lateral slot 186 are wider than diameter 132 of the material forming handle 12 of pin retractor 14. Handle 12 may be formed from one-half inch (½") to five-eighths inch (⅝") diameter steel rods. Therefore longitudinal slots 182, 184 and lateral slot 186 should have a width greater than five-eighths of an inch to accommodate handle 12.

Handle engager 16 of pin retractor operator 180 includes a C-shaped metallic member 188. C-shaped metallic member 188 includes handle-engaging leg 196, wall 198, and upper leg 208 defining an opening 190 and an aperture 200. Opening 190 is wide enough to receive short leg 52 of handle 12 of pin retractor 14. C-shaped metallic member 188 is coupled to handle end 18 of spring 220 by coupling block 192 through which alignment pin 194 passes. Handle-engaging leg 196 of C-shaped metallic member 188 is broader at opening 190 and narrower near wall 198 of internal aperture 200 forming ramp 202 which handle 12, when received in C-shaped metallic member 188, will slide down to engage wall 198 of aperture 200. The presence of ramp 202 ensures that handle 12 does not slide from C-shaped metallic member 188 through opening 190 when under tension.

Thickness 204 of C-shaped metallic member 188 is preferably slightly greater than diameter 88 of the spring steel forming spring 220. C-shaped metallic member 188 has a plurality of connection holes 206 in upper leg 208 of C-shaped metallic member 188 for connection to coupling block 192 as shown, for example, in FIG. 24.

Figure 22:
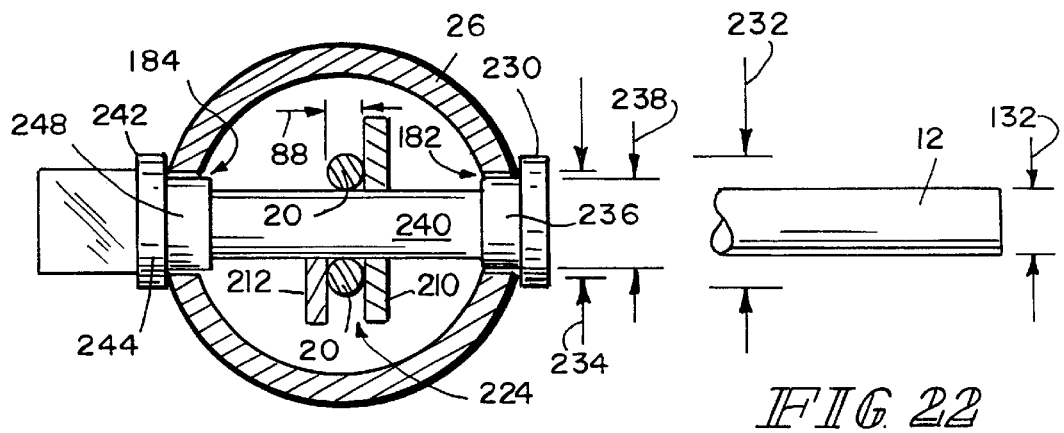
FIG. 22 is a cross sectional view along line 22—22 of FIGS. 13 and 25 of the third and fourth embodiments of the pin retractor operator showing an alignment pin and an end member received in longitudinal slots while the spring extends into a cavity formed between coupling plates and is wrapped around the alignment pin.
Figures 23, 24:
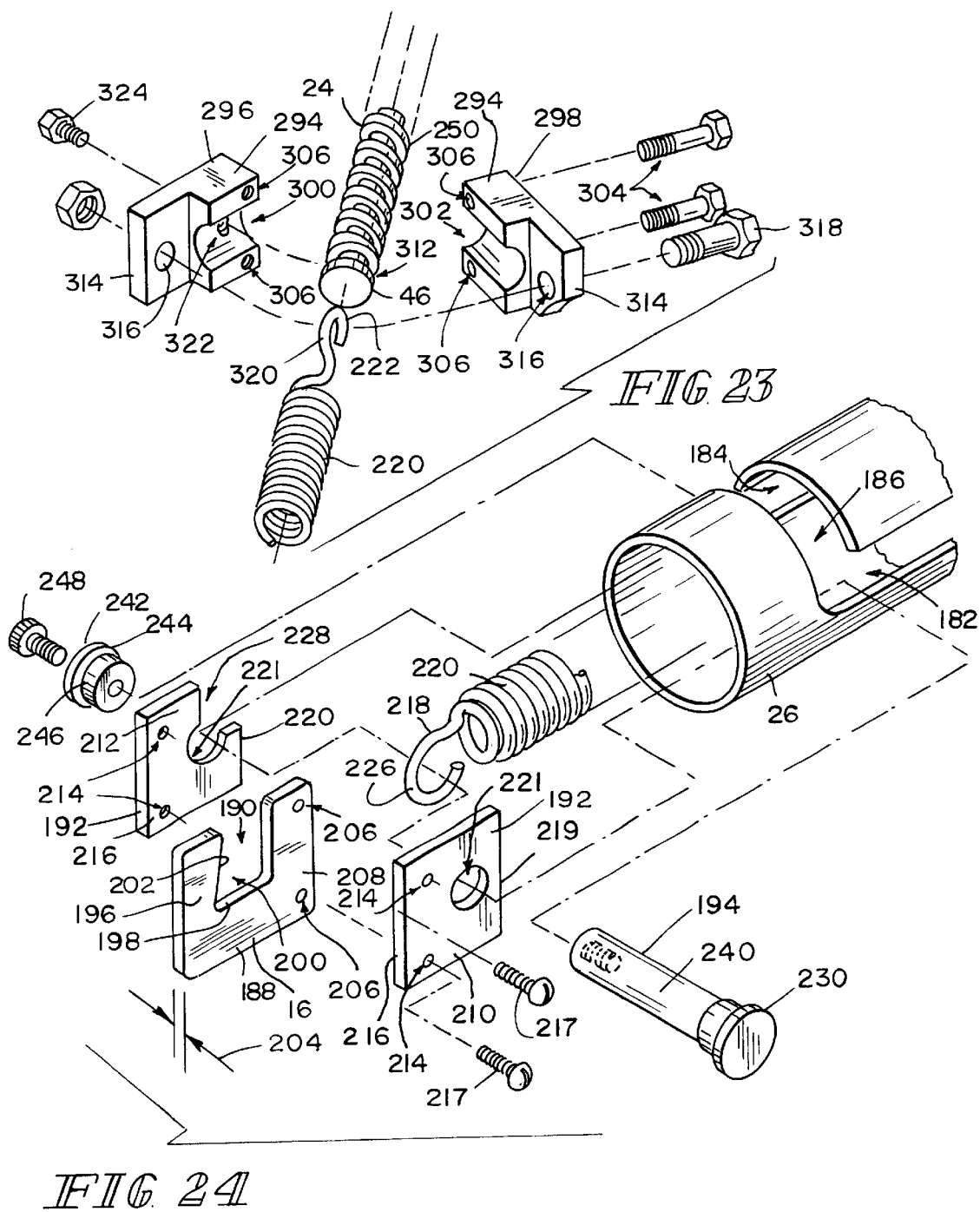
FIG. 23 is an exploded view of a rotating coupling used in the third and fourth embodiments of the pin retractor operator to connect the threaded rod to the spring so that rotation of the threaded rod will not cause rotation of the spring.
FIG. 24 is an exploded view of the coupling used in the third and fourth embodiments of pin retractor operator to couple the spring to the handle engager so that the handle engager is maintained in the proper orientation to receive the pin retractor handle and to prevent rotation of the spring when the threaded rod is rotated.
Figure 28:
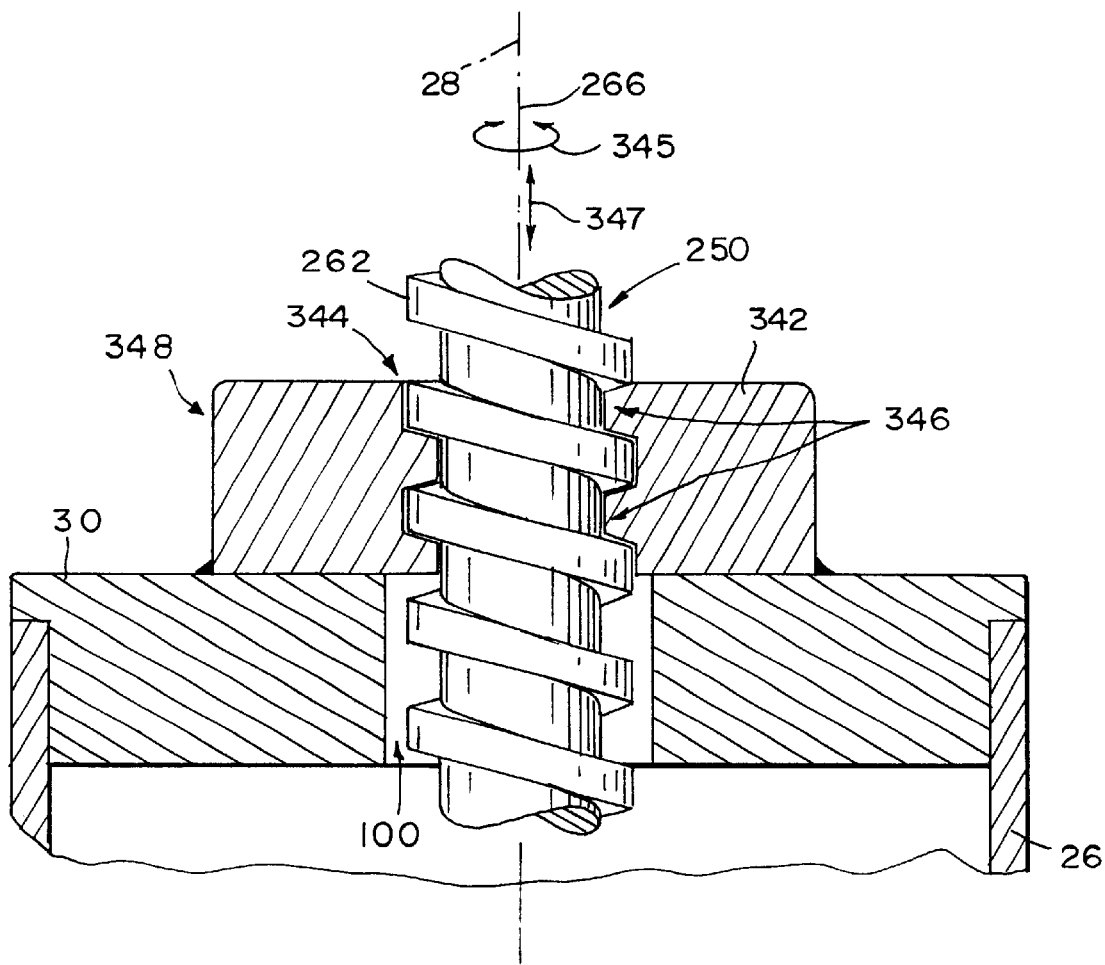
FIG. 28 is a cross sectional view of the screw block of the pin retractor operator of FIG. 25 showing the threaded rod received within a tapped bore of the screw block so that rotation of threaded rod induces movement of the threaded rod along its longitudinal axis.

Coupling block 192 includes two rectangular connection plates 210, 212 formed to include a plurality of connection holes 214 located at a first end 216 positioned to allow joining of connection plates 210, 212 to C-shaped metallic member 188 and to each other with fasteners 217 and an opposite end 219 in which alignment pin receiving hole 221 is formed through which alignment pin 194 is received. When alignment pin 194 is inserted in alignment pin receiving hole 221 and connection plates 210, 212 are connected to each other with C-shaped metallic member 188 juxtaposed therebetween, as shown in FIG. 22, connection plates 210, 212 are separated from each other by a width slightly greater than diameter 88 of the spring material used to form spring 320. Thus connection plates 210, 212 define cavity 224. Handle end 218 of spring 220 is formed into a book 226 so that it can encompass alignment pin 194 and be received in cavity 224 between connection plates 210, 212 as shown in FIGS. 22 and 24. Connection plate 212 differs from connection plate 210 only in that a square of material has been removed from connection plate 212 to form handle end distortion channel 228 to accommodate distortions in the spring material caused by forming handle end 218 into hook 226.

Alignment pin 194 includes head 230 having diameter 232 greater than width 234 of longitudinal slots 182, 184, collar 236 having diameter 238 slightly less than width 234 of longitudinal slots 182, 184, spring-receiving shaft 240, end member 242, and fastener 248. End member 242 includes head 244 and collar 246, having the same diametrical proportions as head 230 and collar 236 respectively, and is connected to spring-receiving shaft 240 by fastener 248.

During assembly: (1) handle end 218 of spring 220 is positioned in cavity 234 in alignment with alignment pin receiving hole 221; (2) alignment pin 194 is inserted in longitudinal slot 182 through alignment pin receiving hole 221 adjacent to longitudinal slot 184; (3) collar 236 of end member 242 is inserted into longitudinal slot 184; and, (4) end member 242 is connected to alignment pin 194 by fastener 248 as shown in FIG. 24. Alignment pin 194 serves the dual purpose of providing a situs around which hook 226 of handle end 218 of spring 220 may be secured and preventing spring 220 from spinning about longitudinal axis 28.

In pin retractor operator 180, tensioner 24 includes threaded rod 250 coupled at internal end 46 to tensioner end 222 of spring 220 so that rotation of threaded rod 250 will not induce rotation of spring 220 as shown, for example, in FIGS. 18–21. Threaded rod 250 extends through smooth bore 100 centrally formed in cap 30 of case 26 and includes rotation actuator 252 such as a T-handle on external end 48 as shown, for example, in FIGS. 18–19.

Directional movement regulator 50 of pin retractor operator 180 includes pivoting ratchet screw regulator 254. Pivoting ratchet screw regulator 234 includes a rod engager 256, spring 274, pivot pin 278, bracket 280, and smooth walled bracket 276. Rod engager 256 includes a rod-engaging end 284 having a concave rod-engaging surface 258 formed to include thread sections 260 thereon and a disengaging end 286. Rod engager 256 is pivotally mounted to cap 30 so that thread sections 260 of concave rod-engaging surface 258: (1) engage thread 262 of threaded rod 250 when rod engager 256 is in a first position, as shown, for example, in FIG. 18; and, (2) do not engage thread 262 of threaded rod 250 when rod engager 256 is in second position, as shown, for example, in FIG. 19. As shown by angle 255 in FIG. 21, rod engager 256 only partially encompasses threaded rod 250 so that only around ninety degrees of a thread may be formed on the rod-engaging surface 258, hence the term thread section 260.

Figure 18:
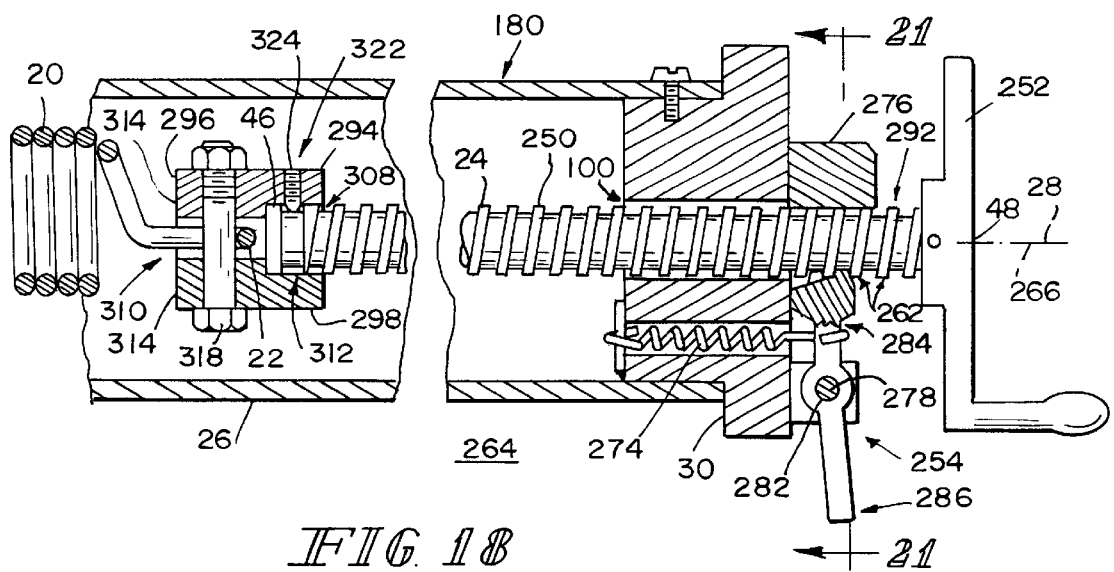
FIG. 18 is an enlarged partial cross sectional view of the pin retractor operator of FIG. 13 providing greater detail of a mechanism connecting the threaded rod to the spring so that the threaded rod may be rotated without inducing rotation of the spring and also showing a directional movement regulator which allows for ratcheting or screwing the tensioner to stretch the spring.
Figure 19:
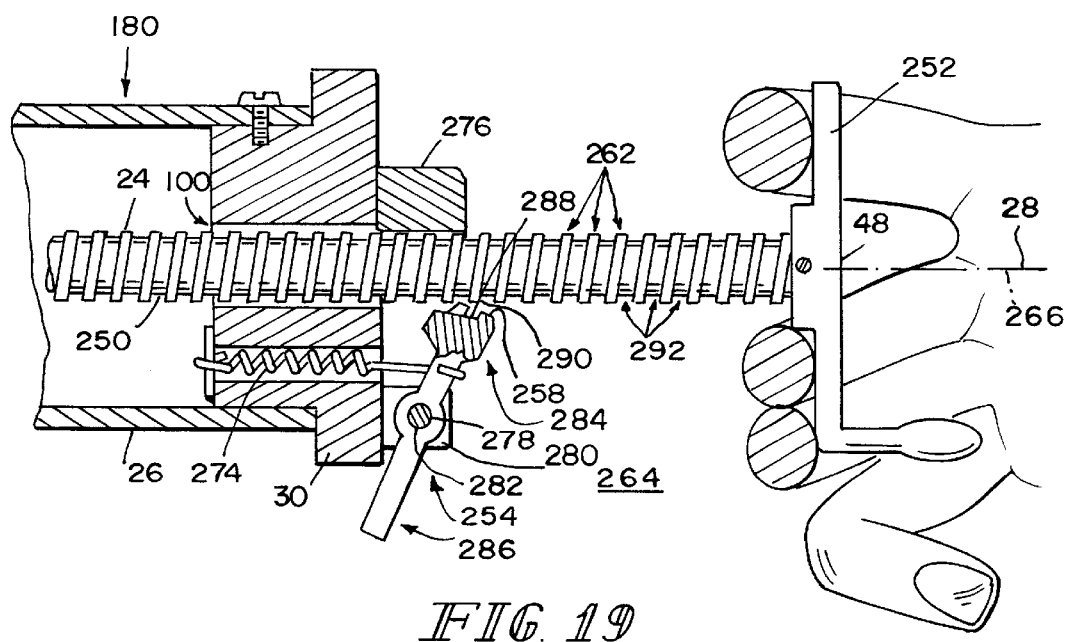
FIG. 19 is a view similar to FIG. 18 demonstrating how the rod engager pivots to allow the threaded rod to be pulled in a "ratcheting fashion" to stretch the spring.
Figure 20:
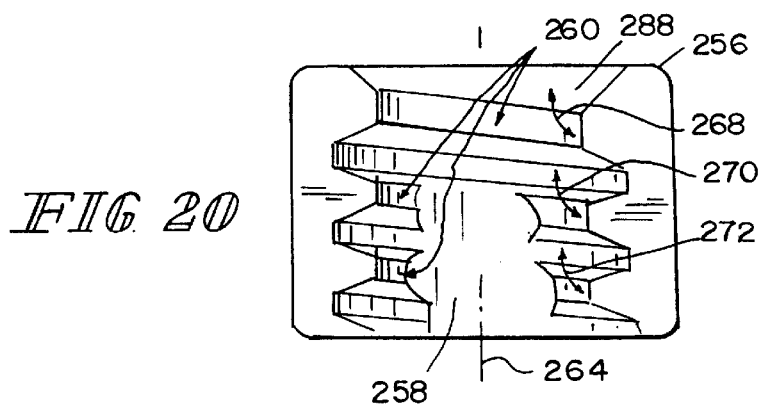
FIG. 20 is a view of the rod engager of the pin retractor operator of FIG. 19 taken along line 20—20 of FIG. 21 showing a continuous thread section and interrupted thread sections which allow the rod engager to act as a "pall" when the threaded rod is pulled in a "ratcheting fashion" by the user.
Figure 21:
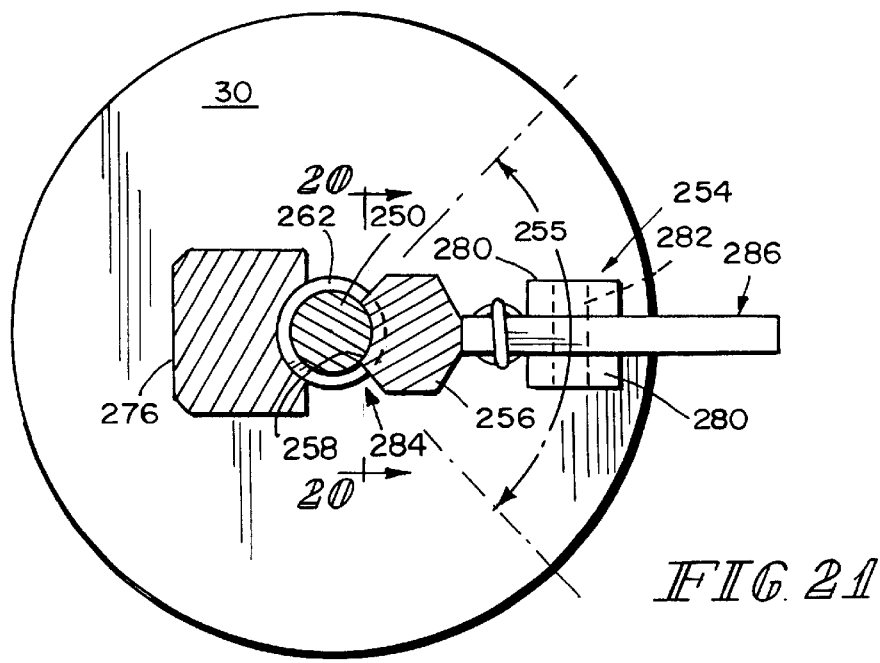
FIG. 21 is a cross-sectional view of the pin retractor operator of FIG. 18 taken along line 21—21 of FIG. 18 showing the rod engager engaging only approximately ninety degrees (90°) of the threaded rod when the threaded rod is pushed against a smooth walled bracket by the biased rod engager.

Rod engager 256 is designed to pivot in the plane 264 including longitudinal axis 266 of threaded rod 250, and longitudinal axis 28 of case 26, and approximately perpendicular to the plane of thread 262, i e. plane 264 is the plane through which the cross-sectional views of FIGS. 18 and 19 are taken. To aid in the pivoting of rod engager 256, thread sections 260 of concave rod-engaging surface 258 contain single continuous top thread section 268 and a plurality of interrupted thread sections 270, 272 disposed thereunder as shown, for example, in FIG. 20. Interrupted thread sections 270, 272 are centrally interrupted to each side of plane of rotation 264 of pivoting rod engager 256, with lower interrupted thread section 272 being interrupted to a greater extent than higher interrupted thread section 270.

The interruption of interrupted thread sections 270, 272 allows rod engager 256 to pivot between the first position and the second position when threaded rod 250 is moved along its longitudinal axis 266 in the direction of arrow 267 in FIG. 14. Interruption of interrupted thread sections 270, 272 may be achieved by grinding away the central portion of those thread sections during manufacturing. The need for interrupted thread sections 270, 272 on rod-engaging surface may be obviated if all thread sections 260 are formed so as to be located above the plane extending through the pivot pin 278 parallel to the threads.

Rod engager 256 is biased by spring 274 to position rod engager 256 in the second position as shown, for example, in FIG. 18. The bias force exerted by spring 274 urges rod engager 256 against threaded rod 250 which, if there is play between threaded rod 250 and smooth bore 100, is urged against smooth walled bracket 276. Smooth walled bracket 276 prevents threaded rod 250 from moving away from rod engager 256 so thread sections 260 remain in engagement with thread 262 of threaded rod 250. Pivot pin 278 attaching rod engager 256 to brackets 280 on cap 30 serves as fulcrum 282 between rod-engaging end 284 and disengaging end 286. Downward force exerted on disengaging end 286 by a truck driver causes rod-engaging end 284 to rotate into first position thereby allowing threaded rod 250 to slide bidirectionally within smooth bore 1100 so that directional movement regulator 5 0 is in the first state.

When an external pulling force or stretching force is applied to threaded rod 250, lower wedge 288 of continuous top thread 268 follows upper wedge 290 of thread 262 of threaded rod 250 in a camming motion causing rod engager 256 to pivot within its plane of rotation 264. Once rod engager 256 has rotated sufficiently to allow thread 262 of threaded rod 250 to pass beyond continuous thread 268, the biasing force on rod engager 256 forces continuous thread 268 into valley 292 between the next two threads 262. This process is then repeated if additional stretching of spring 220 is desired. Thus rod engager 256 allows threaded rod 250 to be pulled past pivoting ratchet screw regulator 254 in a "ratcheting fashion".

Threaded rod 250 is attached for rotation with respect to tensioner end 222 of spring 220 by rotating coupling 294 as shown, for example, in FIG. 23. Rotating coupling 294 includes two substantially symmetrical half bodies 296, 298 formed to include semi-cylindrical depressions 300, 302 and ears 314 formed to include bolt receiving holes 316. When half bodies 296, 298 are connected together by fasteners 304 extending through securing holes 306, semi-cylindrical depressions 300, 302 define rod receiving smooth walled chamber 308, and ears 314 define a spring end receiving cavity 310 as shown, for example, in FIG. 18. Bolt-receiving holes 316 extending through ears 314 are for receiving spring bolt 318. Tensioner end 222 of spring 220 is formed into coupling hook 320 for receiving spring bolt 318 therein.

Thread 262 of threaded rod 250 is machined away to form circumferentially extending groove 312 near internal end 46 of threaded rod 250. Tapped set screw hole 322 extends through half body 296 for receipt of set screw 324 which rides in groove 312 of threaded rod 250. Since set screw 324 rides in groove 312, rotating coupling 294 is free to rotate with respect to threaded rod 256. As was previously described alignment pin 194 is captured within longitudinal slots 182, 184 prohibiting spring rotation, therefore, rotating coupling 294 permits rotation of threaded rod 256 without rotation of spring 220.

Pin retractor operator 180 is attached to handle 12 in substantially the same manner as pin retractor operator 10 and pin retractor operator 150. Pivoting rod engager 256 allows threaded rod 250 to be subjected to an external pulling force or stretching force to stretch spring 220 in the same way that smooth rod 76 and semi-toothed rod 152 are pulled to stretch spring 20, 142 in pin retractor operator 110 and pin retractor operator 150. Drivers will likely use their body weight as well as arm strength to pull threaded rod 250.

Pin retractor operator 180 allows those drivers who are suffering from injuries and those who have lower arm strength and body weight to use a "screwing method" to stretch spring 220. When rod engager 256 engages threaded rod 250, thread sections 260 of rod engager 256 and thread 262 of threaded rod 250 intermesh so that rotation of threaded rod 250 about axis 266 in the direction of arrow 265 in FIG. 16 induces movement of threaded rod 250 along longitudinal axes 28, 266 in the same manner as if threaded rod 250 were received in a tapped hole in cap 30. Thus, once threaded rod 250 is extended as far as the driver can pull it because of the tension being placed in spring 220 as shown, for example, in FIG. 14, additional tension can be imposed upon spring 220 by turning rotation actuator 252 to rotate threaded rod 250 in the appropriate direction to increase the spring tension by further increasing displacement 64 of spring 220 from its equilibrium length 61 as shown, for example, in FIGS. 15, 16.

A fourth embodiment of pin retractor operator is shown, for example, in FIGS. 22–28. Pin retractor operator 340 includes a screw-type regulator 348 which combines thread 262 of threaded rod 250 of tensioner 24 with a screw block 342 having a tapped bore 344 therethrough to regulate movement of the tensioner 24. Therefore, pin retractor operator 340 includes a tensioner 24 including threaded rod 250. Screw block 342 including tapped bore 344 is attached to cap 30 so as to align tapped bore 344 with smooth bore 100. Threaded rod 250 extends through smooth bore 100 and tapped bore 344. Rotation of threaded rod 250 in the direction of arrows 345 about longitudinal axis 266 causes movement in the direction of arrows 347 of threaded rod 250 along longitudinal axes 28, 266 of case 26 and rod 250, respectively.

Because all movement of threaded rod 250 along its longitudinal axis 266 is dependent on rotation of threaded rod 250, and the direction 347 of longitudinal movement is dependent upon the direction 345 of rotation of threaded rod 250, thread 262 on threaded rod 250 and thread 346 of screw block 342 combine to form screw-type regulator 348. The state which screw-type regulator 348 assumes is dependant upon whether driver is willing to rotate threaded rod 250 in a single direction or in both directions. Rather than supplying a separate screw block 342, smooth bore 110 could be tapped to integrally form a screw block within cap 30.

Pin retractor operator 340 is attached to frame 42 and handle 12 in the same manner as pin retractor operators 10, 150, 180. However, spring 220 can only be stretched through rotation of threaded rod 250 as the intermeshing of thread 262 of threaded rod 250 and thread 346 of tapped bore 344 prohibit pulling on threaded rod 250 to induce movement of threaded rod 250 along longitudinal axes 28, 266 of case 26 and rod 250, respectively.

A fifth preferred embodiment of pin retractor operator is shown for example in FIGS. 32–67. FIG. 32 illustrates the pin retractor operator 440 in its fully retracted position. Pin retractor operator 440 includes a tubular case 442, a spring 444, a threaded shaft 446, a swivel connector 448, a washer 450, a cap 452, a partial nut 454, a knob 456, a compression spring 458, a bump stop 460, and a grip 462.

Tubular case 442 has an open frame-engaging end 464, a closed end 466, a side wall 468, and a longitudinal axis 470. Longitudinal slot 472 is formed in side wall 468 extending through open frame-engaging end 464 and partially along the length of case 442. Illustratively, tubular case 442 has a length 474 of 27½ inches, as shown in FIG. 34, an inside diameter 476 of 2¼ inches, and an outside diameter 478 of 2½ inches as shown in FIG. 35. Longitudinal slot 472 has a length 480 of 15½ inches and a width 482 of ¾ inches, as shown in FIG. 35. Longitudinal slot 472 is wider than the diameter 132 of the material forming handle 12 of pin retractor 14. Handle 12 may be formed from one-half inch (½") to five-eighths inch (⅝") diameter steel rods. Therefore longitudinal slot 472 should have a width 482 greater than five-eighths of an inch to accommodate handle 12.

Spring 444 is formed with a handle-engaging hook 484 with an opening 486 that is wide enough to receive handle 12 of pin retractor 14 so that hook 484 acts as a handle engager 16. Illustratively, opening 486 has a width 487 of 0.850 inches. Spring 444 is also formed to include a swivel-engaging hook 488 on the tensioner end 22 of spring 444. Swivel-engaging hook 488 passes through attachment hole 490 in swivel sleeve 492 which along with swivel pin 494 forms swivel connector 498, as shown for example in FIG. 32.

Figures 39, 40:
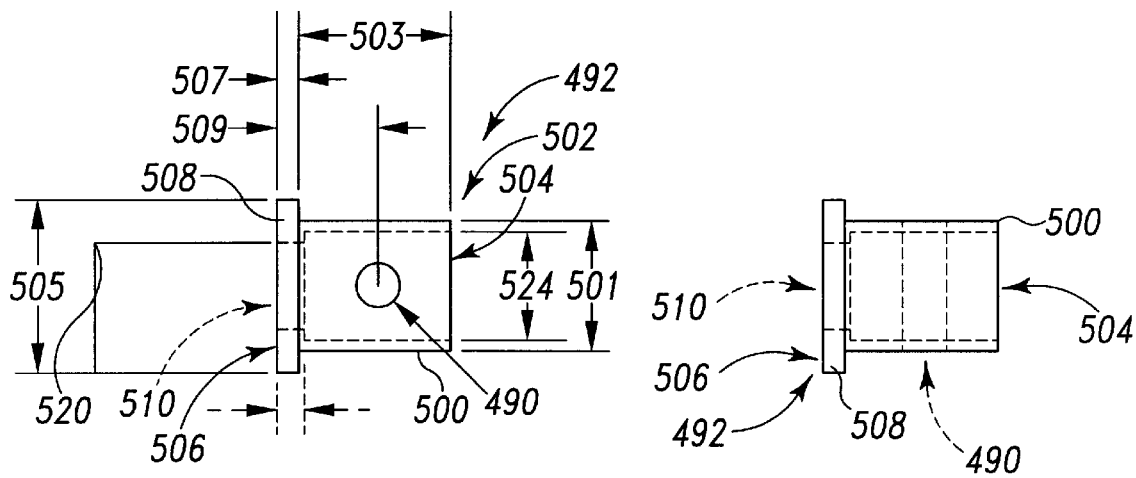
FIG. 39 is a top view of the swivel sleeve forming a portion of the swivel connector of FIG. 32.
FIG. 40 is a side view of the swivel sleeve of FIG. 39.
Figure 41:
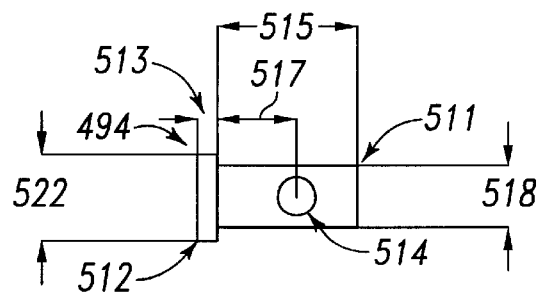
FIG. 41 is a top view of the swivel pin forming a portion of the swivel connector of FIG. 32.
Figure 42:
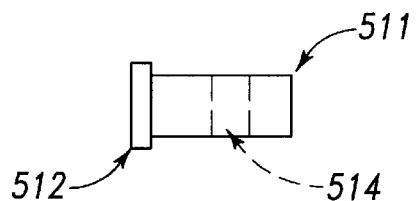
FIG. 42 is a side view of the swivel pin of FIG. 41.
Figure 43:
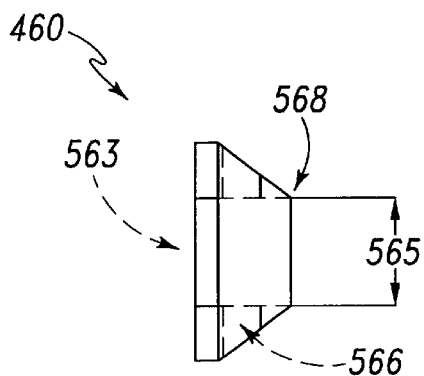
FIG. 43 is a side view of the bump stop of FIG. 32.
Figure 44:
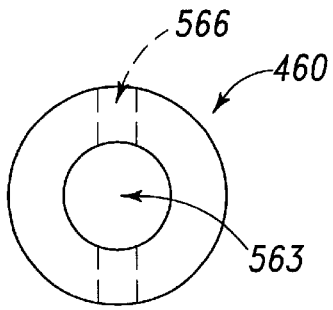
FIG. 44 is a top view of the bump stop of FIG. 43.
Figure 45:
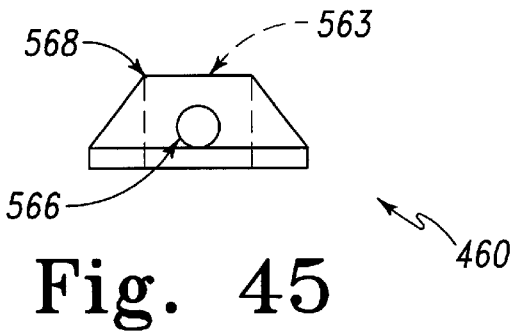
FIG. 45 is another side view of the bump stop of FIG. 44.
Figure 46:
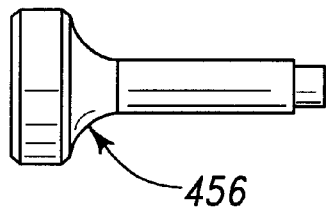
FIG. 46 is a side view of the knob of FIG. 32.
Figure 47:
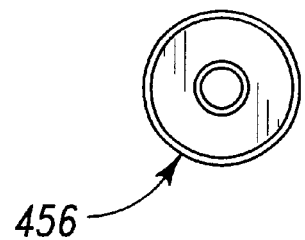
FIG. 47 is a top view of the knob of FIG. 46.
Figure 48:
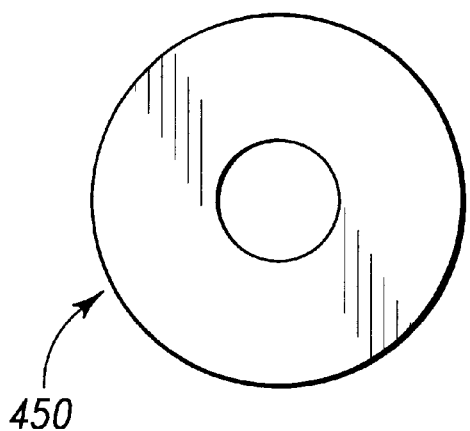
FIG. 48 is a top view of a washer shown between the swivel connector and the hook in FIG. 32.
Figure 49:
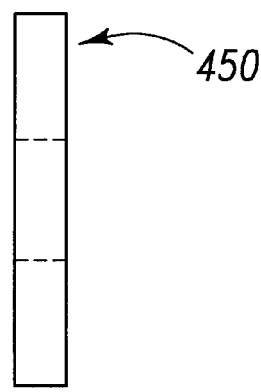
FIG. 49 is a side view of the washer of FIG. 48.
Figure 50:
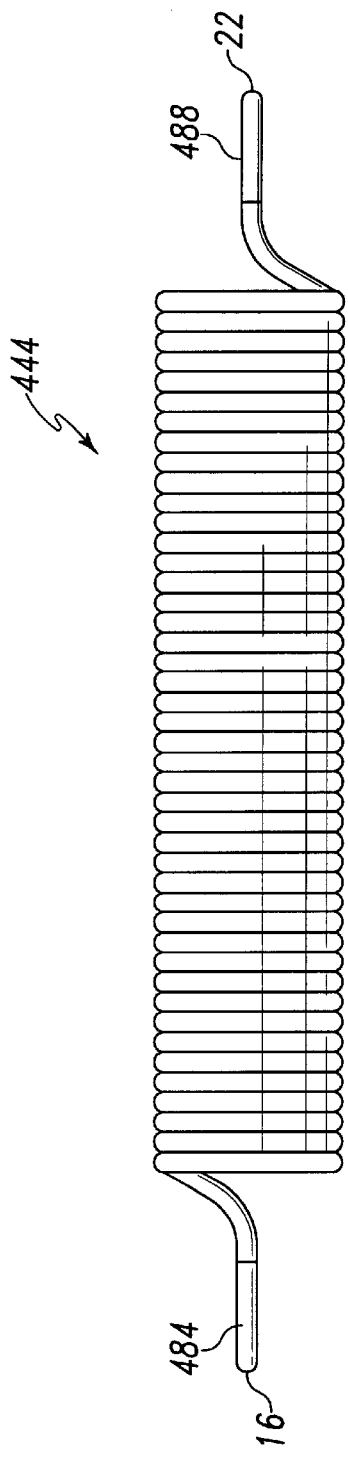
FIG. 50 is a top view of the spring of FIG. 32.
Figure 51:
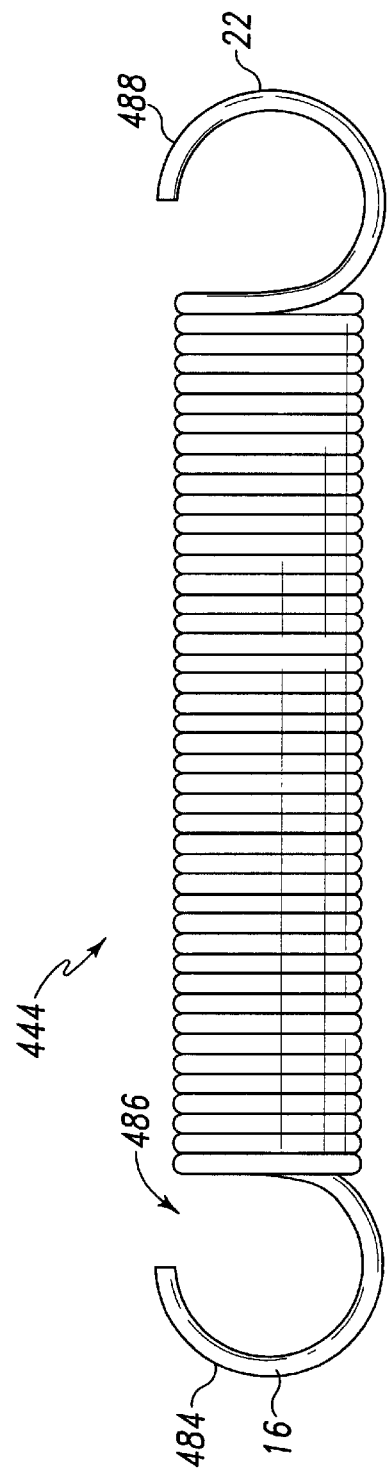
FIG. 51 is a side view of the spring of FIG. 50.

Swivel connector 498, as was mentioned above, includes swivel sleeve 492 and swivel pin 494 which are shown in more detail in FIGS. 40–42. Swivel sleeve 492 includes a side wall 500 forming a hollow cylindrical body 502 having an open end 504 and a second end 506 partially enclosed by flange 508 which is formed to include a hole 510 therethrough. Attachment hole 490 extends through side wall 500 for receipt of swivel-engaging hook 484 of spring 444 therethrough. Illustratively, cylindrical body 502 has an outside diameter 501 of 0.75 inches, an inside diameter 524 of 0.625 inches and a length 503 of 0.875 inches. Center of attachment hole 590 is spaced apart from flange 508 by a distance 509 of 0.419 inches. Illustratively, Flange 508 has an outside diameter 505 of one inch and a thickness 507 of 0.125 inches. Hole 510 has an inside diameter 520 of 0.5 inches.

Swivel pin 494 includes a solid cylindrical body 511 and a head 512 attached at one end. A shaft attachment hole 514 is formed through solid cylindrical body 511 as shown in FIGS. 41–42. Solid cylindrical body 511 has an outside diameter 518 slightly less than diameter 520 of the hole 510 through flange 508 of swivel sleeve 492. Illustratively, outside diameter 518 is 0.498 inches. Diameter 522 of head 512 of swivel pin 494 is slightly less than inside diameter 524 of hollow cylindrical body 502 of swivel sleeve 492. Illustratively diameter 522 is 0.618 inches. Head 518 has a thickness 513 of 0.125 inches and cylindrical body 511 has a length 515 of one inch. Center of attachment hole 514 is spaced apart from head 512 by a distance 517 of 0.558 inches.

During assembly, solid cylindrical body 511 of swivel pin 494 is inserted through open end 504 and extends through hole 510 in flange 508 of swivel sleeve 492. Head 512 of swivel pin 494 is received in hollow cylindrical body 502 and abuts flange 508 of swivel sleeve 492 allowing swivel pin 494 to swivel with respect to swivel sleeve 492.

Threaded shaft 446 includes swivel end 526, a grip end 528, a longitudinal axis 530, a cavity 532 having an inside diameter 534 formed in swivel end 526, an attachment hole 536 extending through cavity 532 near swivel end 526, and an attachment hole 538 extending through shaft near grip end 528. Illustratively, threaded shaft 446 has an overall length 527 of 22¾ inches, a length 529 from end 526 to attachment hole 538 of 20⅜ inches, and a length 531 from end 526 to end of thread 533 of 20 inches. Attachment hole 536 is spaced apart from end 526 by a distance 535 of 0.375 inches and start of thread 537 is spaced apart from end 526 by a distance 539 of 0.74 inches. Except for cavity 532, threaded shaft 446 is a solid shaft having a major diameter 540 within which modified buttress thread 542 is cut over most of the length of shaft 446.

Inside diameter 534 of cavity 532 is slightly greater than outside diameter 518 of solid cylindrical body 511 of swivel pin 494. Illustratively, inside diameter 534 is 0.500 inches. During assembly, solid cylindrical body 510 of swivel pin 494 is inserted into cavity 532 of threaded shaft 446. Threaded shaft 446 is connected to swivel connector 498 by roll pin 496 extending through attachment hole 536 in swivel end 526 of shaft 446 and shaft attachment hole 516 in swivel pin 494. Illustratively roll pin 496 has a length 497 of one inch and a diameter 499 of ¼ inches. Since spring 444 is connected to swivel sleeve 492 of swivel connector 498 and shaft 446 is connected to swivel pin 494 of swivel connector 498, shaft 446 is swivably connected to spring 444.

Figure 36:
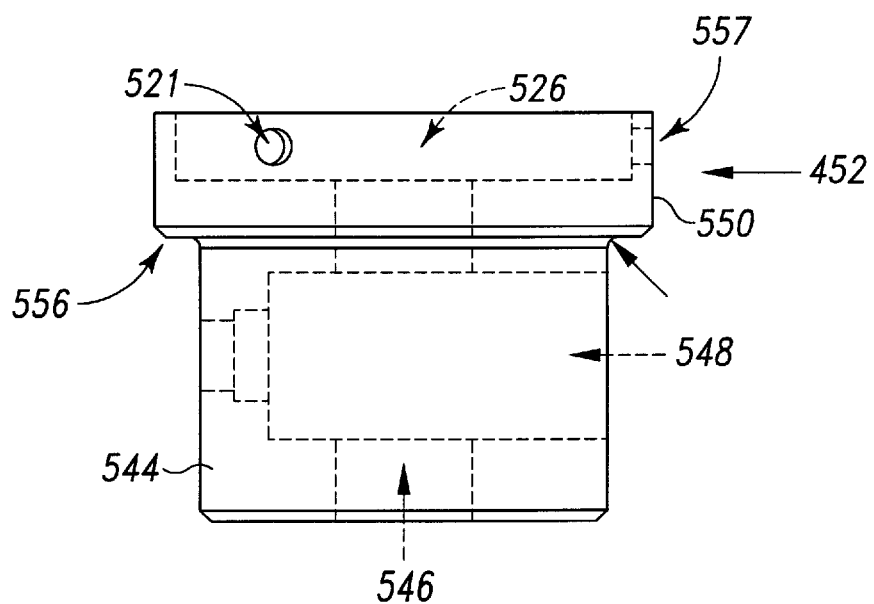
FIG. 36 is a side view of the cap of FIG. 32 showing internal cavities in phantom lines.
Figure 37:
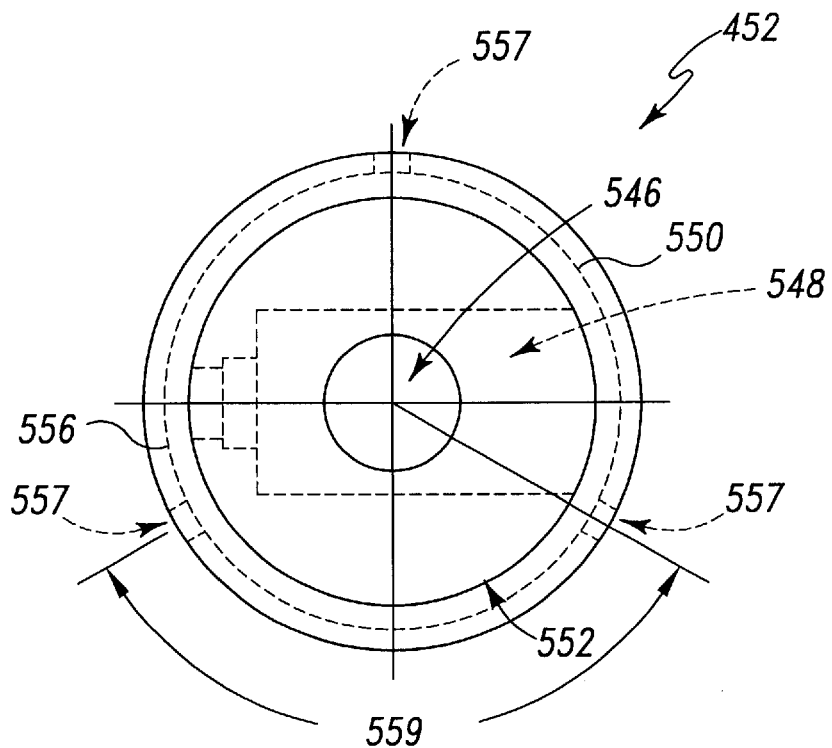
FIG. 37 is an end view of the cap of FIG. 36 showing internal cavities in phantom lines.
Figure 38:
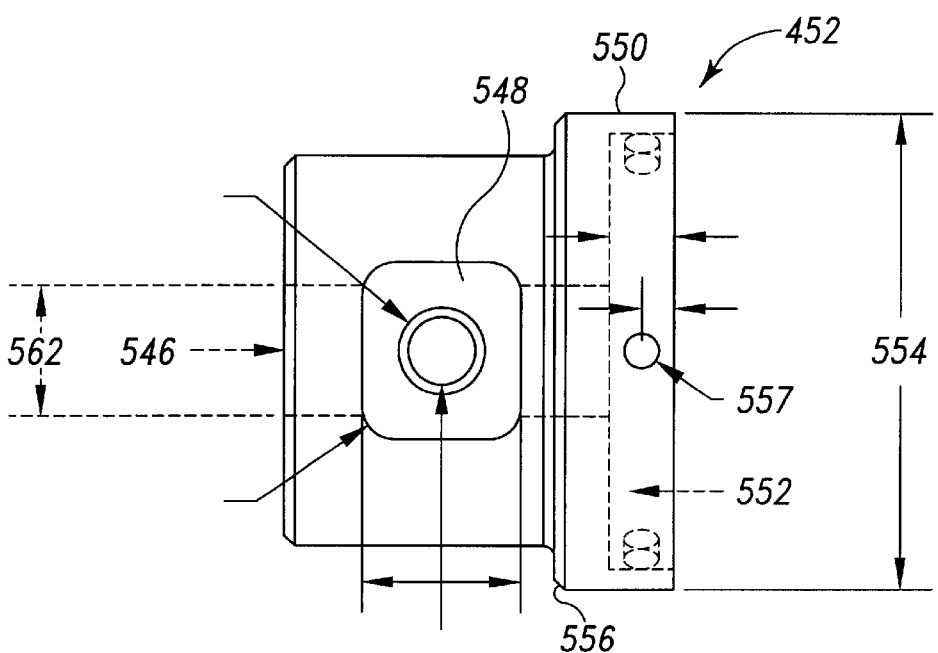
FIG. 38 is a side view of the cap of FIG. 37.

Cap 452 includes a hub 544 with a bore 546 extending longitudinally therethrough and a nut-receiving cavity 548 extending radially therethrough, a flange 550 formed to include a cavity 552 having an inside diameter 554, and a shoulder 556 extending between and connecting flange 550 to hub 544, as shown, for example, in FIGS. 36–38. Flange 550 has three connection holes 557 offset by an angle 559 of 120 degrees extending radially into cavity 552. Inside diameter 554 of cavity 552 is slightly greater than outside diameter 478 of case 442. Illustratively diameter 554 is 2.520 inches. Closed end 466 of case 442 is also formed to include three connection holes 558 offset from each other by an angle 561 of 120 degrees, as shown, for example, in FIG. 35. Closed end 466 of case 442 is received in cavity 552 of cap 452 and is attached to cap 452 by connector screws 560 (FIGS. 52–53) extending through connection holes 557, 558, as shown, for example, in FIG. 32.

Bore 546 has diameter 562 slightly greater than major diameter 540 of shaft 446. Illustratively, diameter 562 is 0.755 inches. Therefore shaft 446 extends through bore 546 and is slidably received therethrough. Sliding of shaft 446 within bore 546 is inhibited by partial nut 454 which is received in nut-receiving cavity 548. Partial nut 454 is biased to engage shaft 446 by biasing spring 558 and thereby inhibits sliding of shaft 446 within bore 546.

A conically shaped bump stop 460 is attached to shaft 446 between cap 452 and grip 462, as shown, for example, in FIG. 32. Bump stop 460 is formed to include aperture 563 having an inside diameter 565 sized to receive threaded shaft 446. Illustratively, inside diameter 565 is $13/16$ inches. Threaded shaft 446 includes an attachment hole 538 extending therethrough near grip end 528 for receipt of a pin 564 extending through a hole 566 in bump stop 460 to attach bump stop 460 to shaft 446. Bump stop 460 is designed to prevent grip 462 from coming into contact with cap 452. Bump stop 460 is conically shaped with narrower end 568 engaging the cap 452 to inhibit the finger of a user from being trapped between stop 460 and cap 452 or between grip 462 and cap 452.

Partial nut 454 and threaded shaft 446 each include modified buttress threads 569 and 542 respectively so that when partial nut 454 is urged into thread channel 570 of threaded shaft 446 rotation of shaft 446 will induce movement of shaft 446 along its longitudinal axis 530 with respect to partial nut 454. The partial threads 572 of partial nut 454 and thread 542 of shaft 446 are also designed to facilitate pulling on the shaft 446 to induce lineal movement of shaft 446 relative to partial nut 454. Description of modified buttress thread 542 on shaft 446 will facilitate understanding this aspect of the invention.

Figure 61:
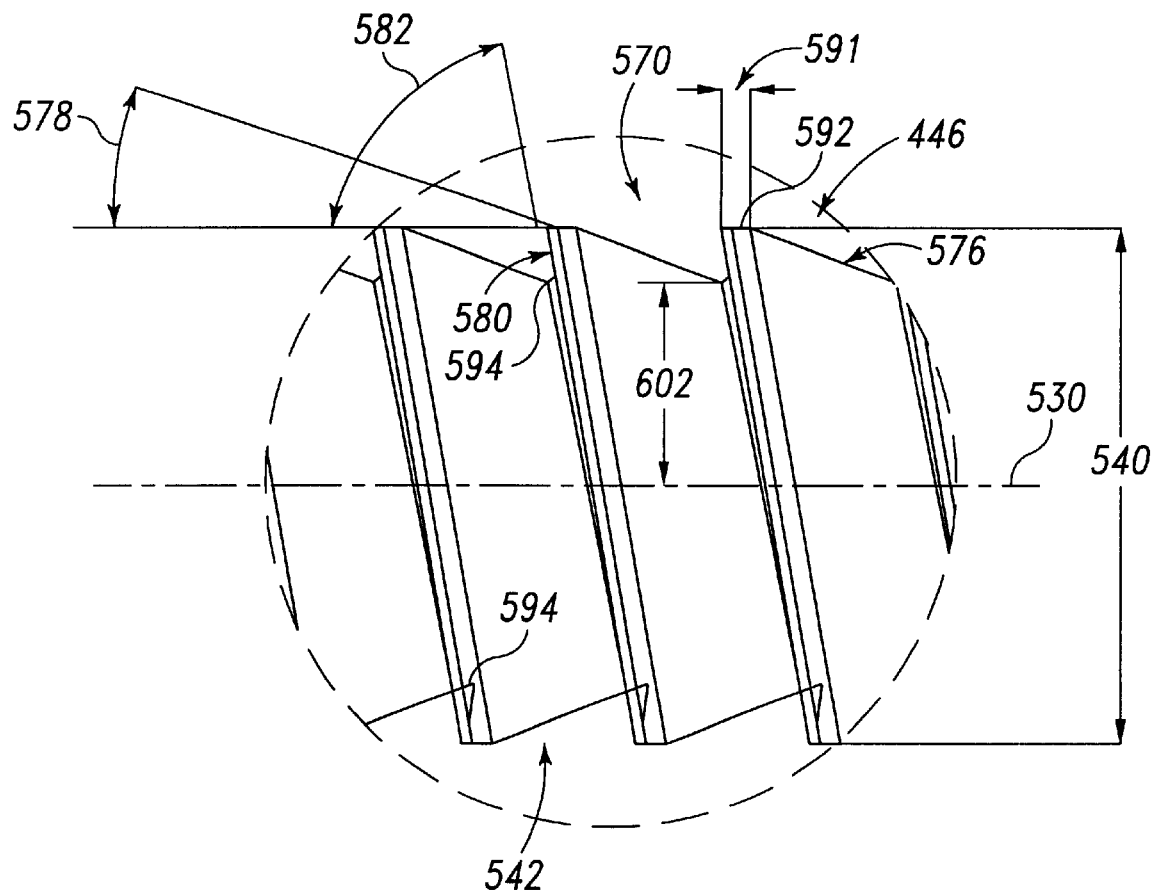
FIG. 61 is a detailed view of the portion of threaded shaft enclosed in circle 61 of FIG. 60 showing the modified buttress thread design having a back angle to the driving face to facilitate screw action.
Figure 67:
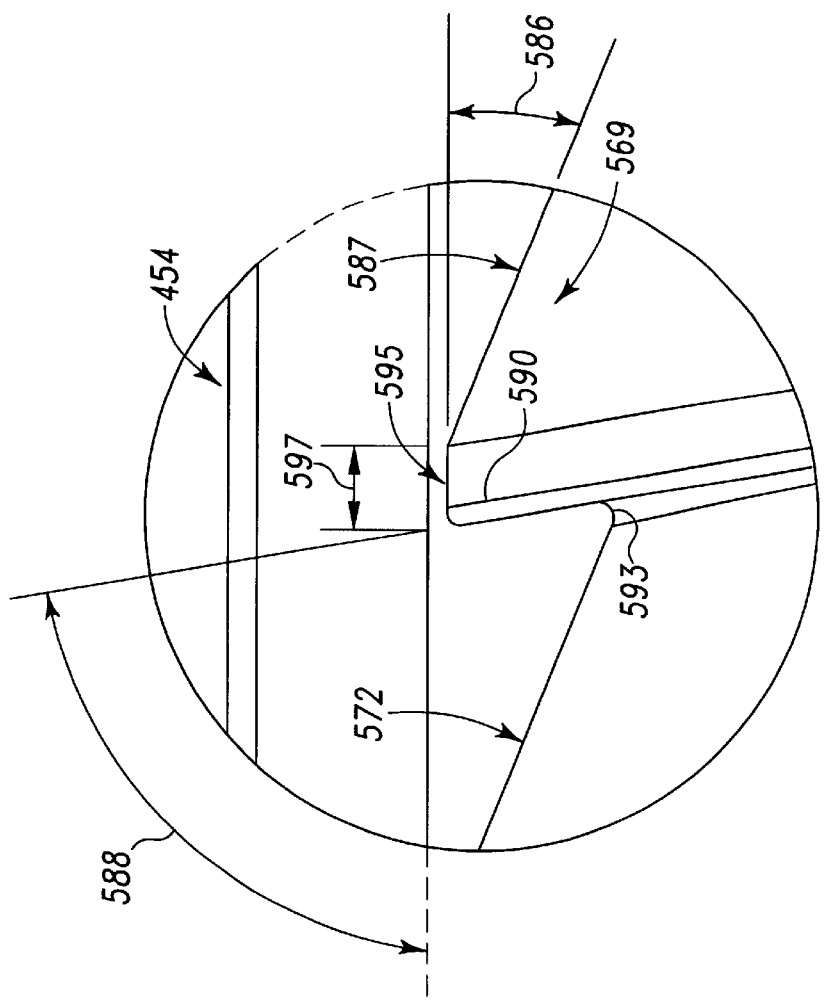
FIG. 67 is a detailed view of that portion of partial nut enclosed in circle 67 of FIG. 66 showing back angles formed in the driven faces of the partial threads of the nut.
Figure 66:
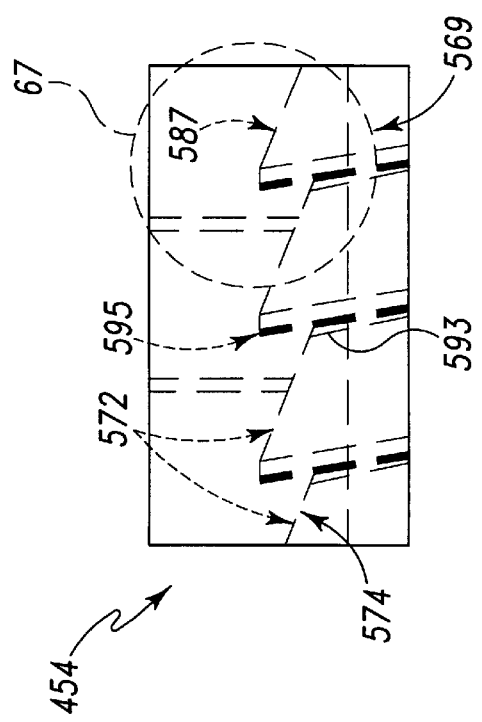
FIG. 66 is a sectional view along line 66—66 of FIG. 65.

FIG. 61 illustrates modified buttress thread 542 of threaded shaft 446 of the present invention. Similarly, FIG. 67 illustrates modified buttress partial threads 572 formed into shaft-engaging surface 574 of partial nut 454. Standard buttress threads include a driving or forward face which is perpendicular to the screw axis and a back face which is at an angle to the screw axis so that the thread is both efficient and strong. The modified buttress thread 542 of the present invention includes a back face 576 which is at an angle 578 to longitudinal axis 530 of threaded shaft 446 and a driving face 580 which is also at an angle 582 to longitudinal axis 530 of threaded shaft 446. In the illustrated embodiment, back face 576 of modified buttress thread 542 of shaft 446 is at a back face angle 578 of 21 degrees (measuring the angle clockwise as shown in FIG. 61 from longitudinal axis 530 to back face 576) from longitudinal axis 530 of shaft 446, as shown, for example, in FIG. 61. This back face angle 578 is substantially similar to the back face angle which would be found in a standard buttress thread having the same pitch 584. However, the driving face 580 of modified buttress thread 542 of shaft 446 is at a driving face angle 582 of 80 degrees (measuring the angle clockwise as shown in FIG. 61 from longitudinal axis 530 to driving face 580) from longitudinal axis 530 of shaft 446, as shown, for example, in 61. Thus driving face angle 582 is ten degrees different than the perpendicular driving face angle of a standard buttress thread.

Partial nut 454 includes partial threads 572 which conform to modified buttress thread 542 of shaft 446. Back face angle 586 of back face 587 of partial threads 572 is substantially equal to back face angle 578 of threaded shaft 446. Likewise driven face angle 588 of driven face 590 of the partial threads 572 (driving and driven being relative terms) is substantially equal to driving face angle 582 of driving face 580 of threaded shaft 446. Various driving face angles 582 and driven face angles 588 have been tested and, while a standard buttress thread may be used within the scope of the pin retractor operator 440 of the present invention, a modified buttress thread having a driving face angle 582 and driven face angle 588 of less than 90 degrees is preferred.

Figure 68:
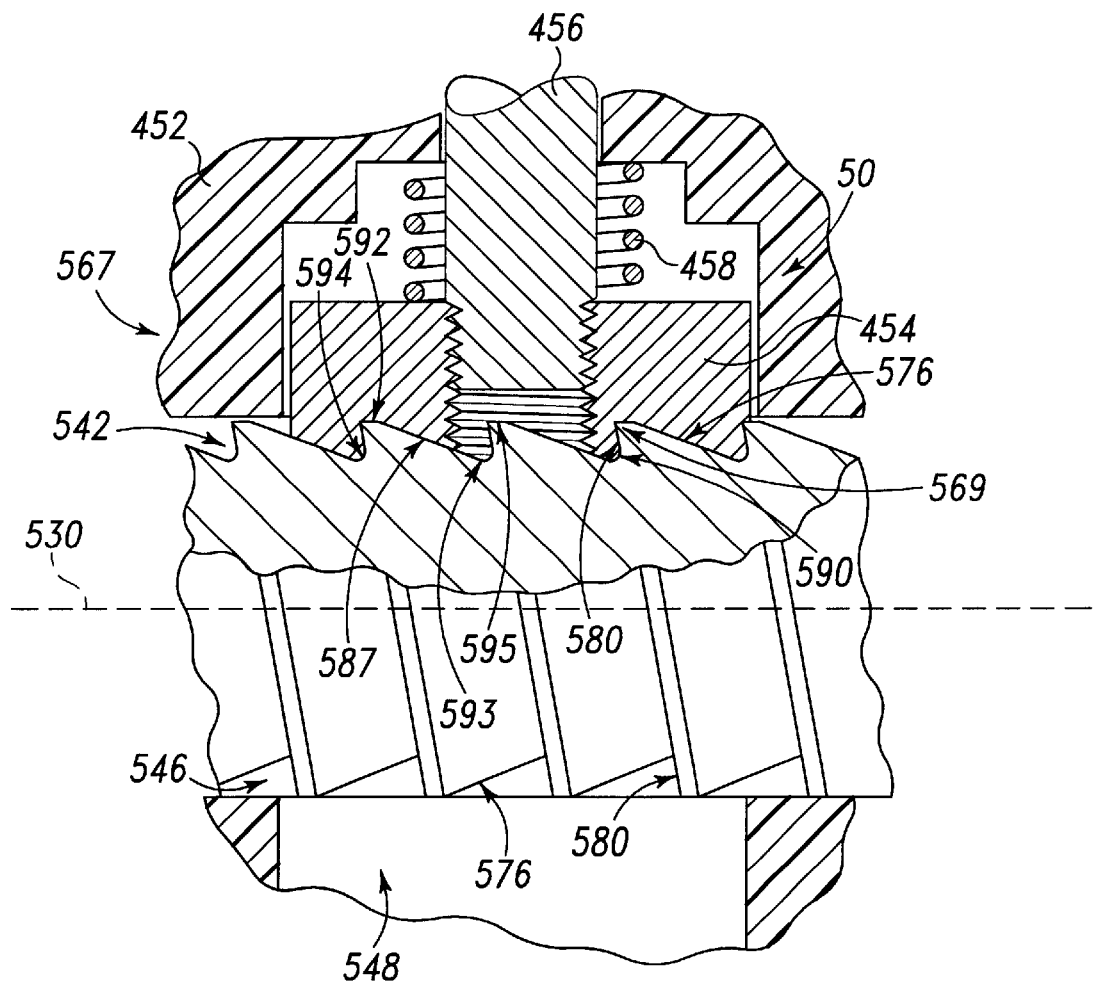
FIGS. 68–72 illustrate how an axial force exerted toward the right on the threaded shaft urges the partial nut upwardly to allow the shaft to move to the right and how the compression spring induces the partial threads of the partial nut to seat in the thread of the shaft when the axial force is removed so that an axial force can be used to move the shaft in increments of the pitch of the thread.

In the illustrated embodiment, modified buttress threads 572, 542 of both the partial nut 454 and threaded shaft 446 have a ¼ inch pitch 584. Modified buttress thread 542 includes a flat or slightly radiused crest 592 substantially parallel to the longitudinal axis 530 having a length 591 of $4/100$ of an inch and a flat or slightly radiused root 594. Thread 542 of shaft 446 is a single continuous thread extending along the length of shaft 446. Partial threads 572 of partial nut 454 would, if formed in a complete nut, be a single continuous thread. Illustratively partial threads 572 have a slightly radiused crest 593 which, when partial threads 572 are fully seated in thread channel 570 of thread 542, abut or are adjacent to radiused root 594 of thread 542, as shown, for example, in FIGS. 68 and 72. Partial threads 572 also include a flat or slightly radiused root 595 having a length 597 of $4/100$ of an inch. Roots 595 of partial threads 572 are adjacent to or abut crest 592 of thread 542 when partial threads 572 are fully seated in thread channel 570 of thread 542. As the pitch 584 of threads change, the measurements and angle disclosed herein will change accordingly, however any modified buttress thread will always have a driving face angle 582 or driven face angle 588 of less than 90 degrees in accordance with the present invention.

When a user pulls on grip 462 of threaded shaft 446, back face 576 of thread 542 of shaft 446 pushes against back faces 587 of partial threads 572 and urges partial nut 454 away from shaft 446 thereby further compressing bias spring 458. When crests 593 of partial threads 572 pass over crest 592 of thread 542, bias spring 458 urges partial threads 572 back into thread channel 570 of shaft 446. Thus partial threads 572 of partial nut 454 act as a pawl with respect to the ratchet of thread 542 of shaft 446, as shown, for example, in FIGS. 68–72.

It should be understood that if partial threads 572 of partial nut 454 extended over half-way around shaft 446 then the ends 596, 598 of partial threads 572 would engage root 594 of thread 542 preventing partial nut 454 from being urged away from shaft 446 by a pulling force. To prevent this from happening, partial nut 454 is typically formed from half or less of a full nut. It has been found that if a full nut is tapped with the modified buttress thread and then cut in half, two partial nuts 454, each being slightly less than a half nut, can be formed. FIG. 64 illustrates just such a nut. As shown in FIG. 64, the whole nut was tapped to form a minor diameter 600 substantially equal to the minor diameter 602 of thread 542 of shaft 446, and a major diameter 604 substantially equal to major diameter 540 of shaft 446. In the illustrated embodiment major diameters 604, 540 of partial threads 572 of the partial nut 454 and the thread 542 of the threaded shaft 446 are ¾ inches, while the minor diameters 602, 600 of both are ⅝ inches.

To facilitate having partial nut 454 pushed away from shaft 446 by a pulling action, both ends 596, 598 of partial threads 572 are partially machined away so that the portion of partial threads 572 that would engage root 594 of thread 542 is eliminated near ends 596, 598 as shown in FIG. 65. In the illustrated embodiment ends 596, 598 are machined away by a ¾ inch end mill jogged side to side. Thus near ends 596, 598 of partial threads 572 only a portion of partial threads 572 remains. By using a substantial half nut and machining away portions of partial threads 572, more thread can be saved allowing a greater force to be applied to the shaft 446 without failure. If even more thread is wished to be preserved, it is within the teaching of this invention to use multiple partial nuts 452 spring biased to engage shaft 446.

Driving face angle 582 and driven face angle 588 aid in maintaining thread 542 of shaft 446 firmly seated in partial threads 572 of partial nut 454 while shaft 446 is being rotated to further extend spring 444. The force of spring 444 pulling on swivel end 526 of shaft 446 urges driving face 580 of thread 542 of shaft 446 against driven faces 587 of partial threads 572 of partial nut 454. As driven faces 587 follow driving face 580, partial threads 572 are urged deeper into thread channel 570. This prohibits partial threads 572 from riding out of thread channel 570 during rotation of shaft 446.

While the modified buttress thread mechanism 567 employing a partial nut 454 spring biased against a threaded shaft 446 described herein and shown in detail in FIGS. 68–72 is described as being used in a pin retractor operator 440, it is to be understood that the mechanism may be used with other types of machinery and tools. In pin retractor operator 440, the ratcheting action of the modified buttress thread mechanism 567 is used to quickly store substantial energy within spring 444 and the rotating action of shaft 446 is used to store additional energy. In other applications of the modified buttress thread mechanism 567, in which the mechanism 567 is used more for positioning than fair energy storage, the ratcheting action can be used to roughly adjust the position while the rotating action can be used to finely tune the position. Thus buttress thread mechanism 567 can also be used as a positioning mechanism.

Figure 69:
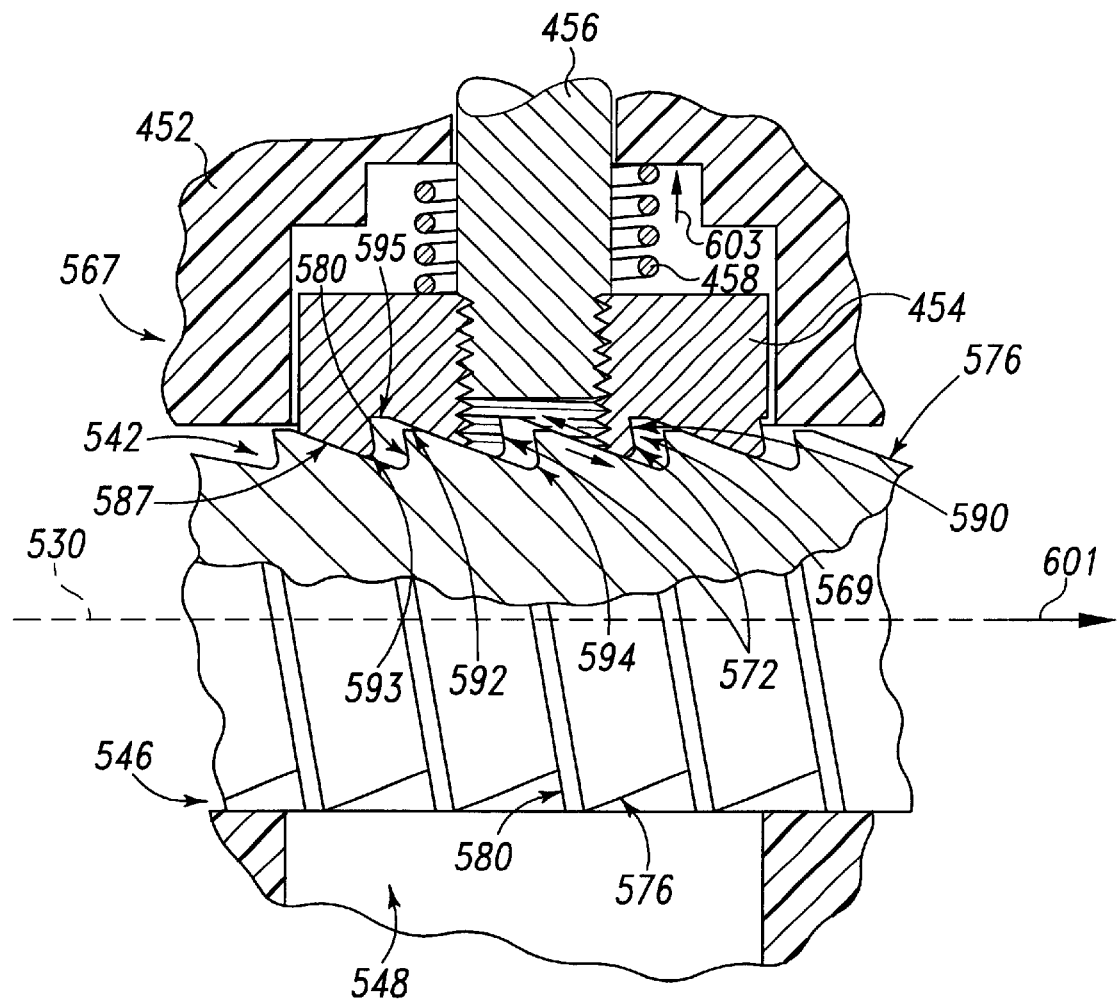
Figure 70:
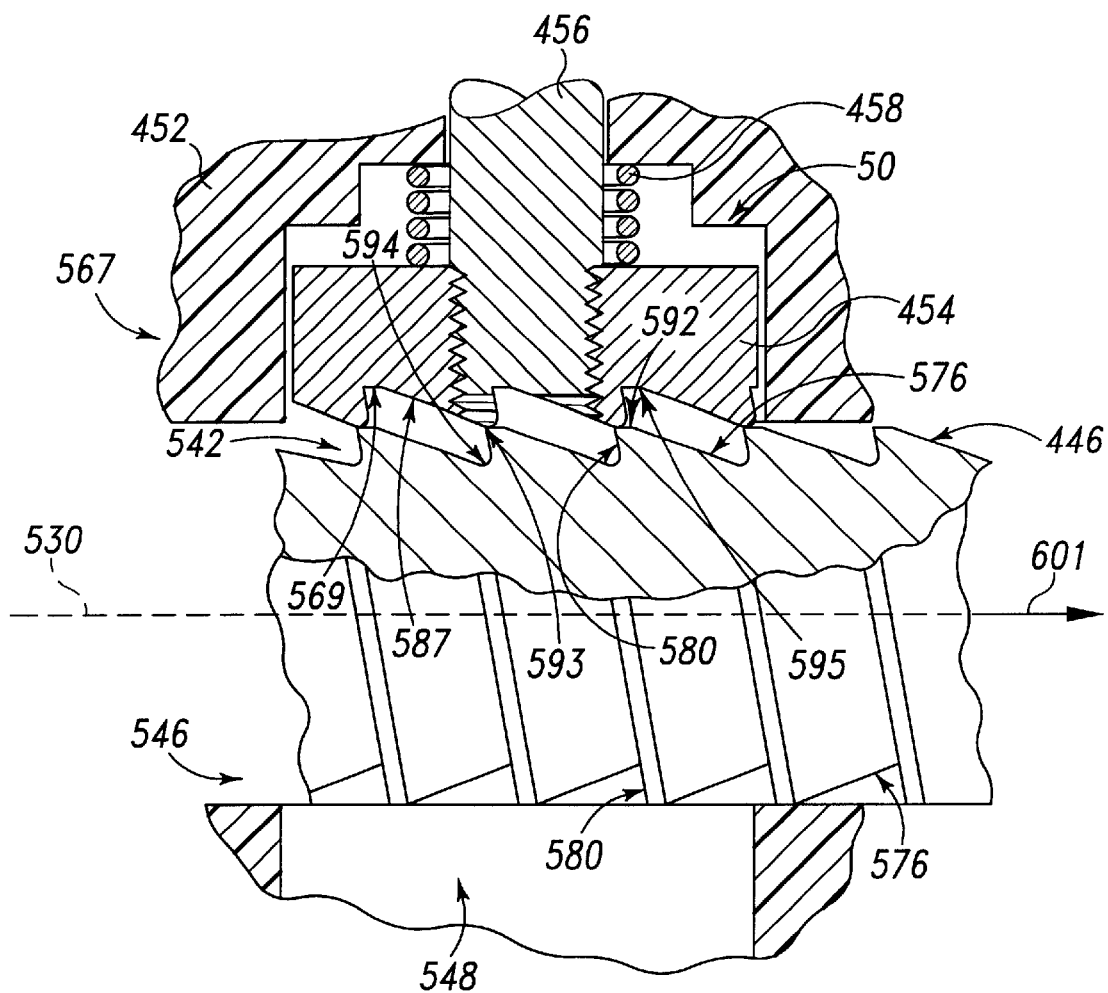

A linear force applied to shaft 446 along longitudinal axis 530 in a first direction 601 will urge back faces 587 of partial threads 572 to slide along back face 576 of thread 542 to induce shaft-engaging surface 574 away from shaft 446 in the direction of arrow 603 in FIG. 69 facilitating movement of shaft 446 in the first direction 601 along longitudinal axis 530 relative to partial nut 454. Since thread 542 and partial threads 572 both include a pitch 584, the linear force applied to shaft 446 in direction 601 will induce shaft 446 to move a distance substantially equal to pitch 584 before partial threads 572 can again seat within thread 542. Each time shaft 446 moves a distance substantially equal to pitch 584, partial threads 572 are again positioned to seat within thread 542.

Figure 71:
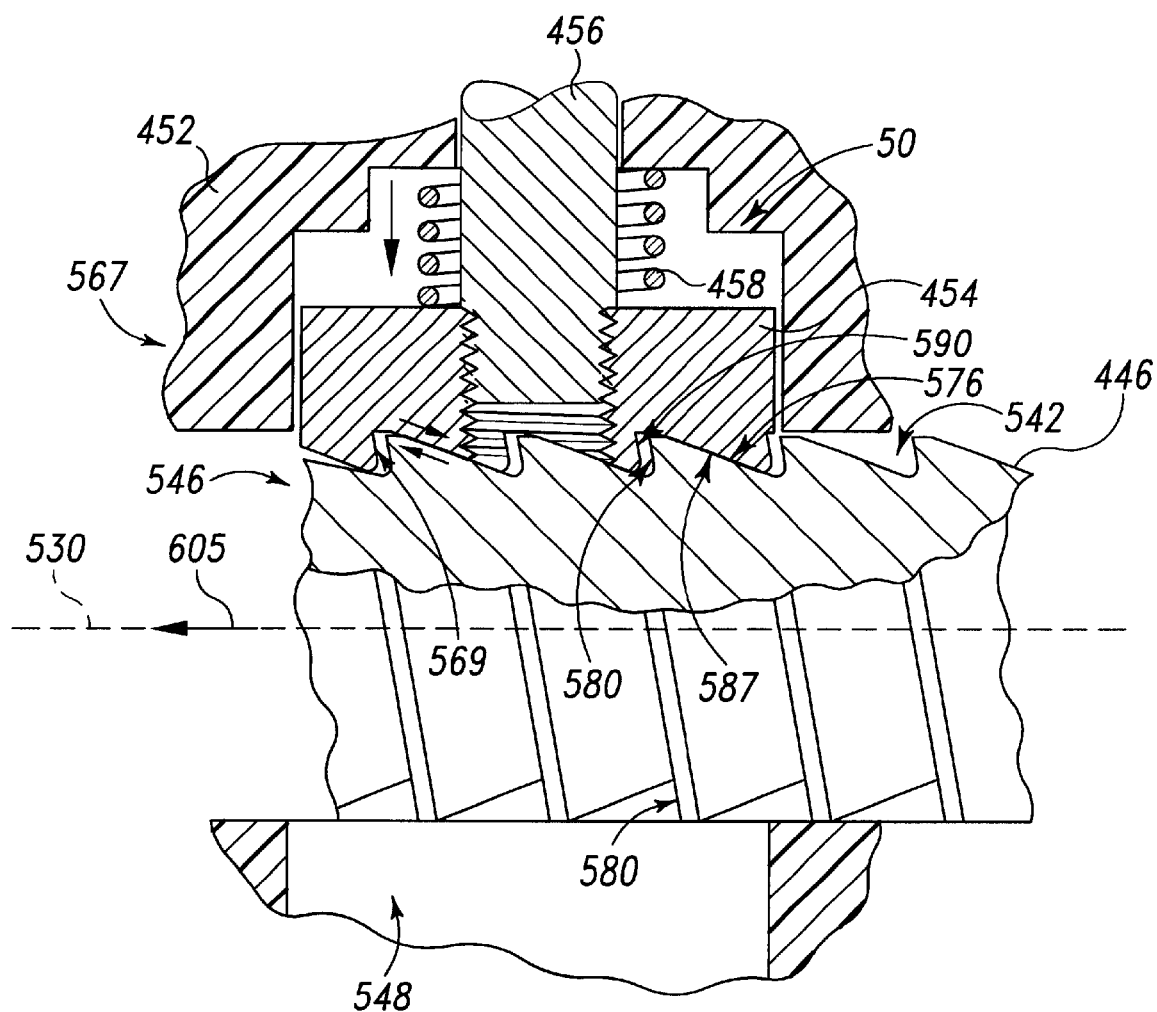
Figure 72:
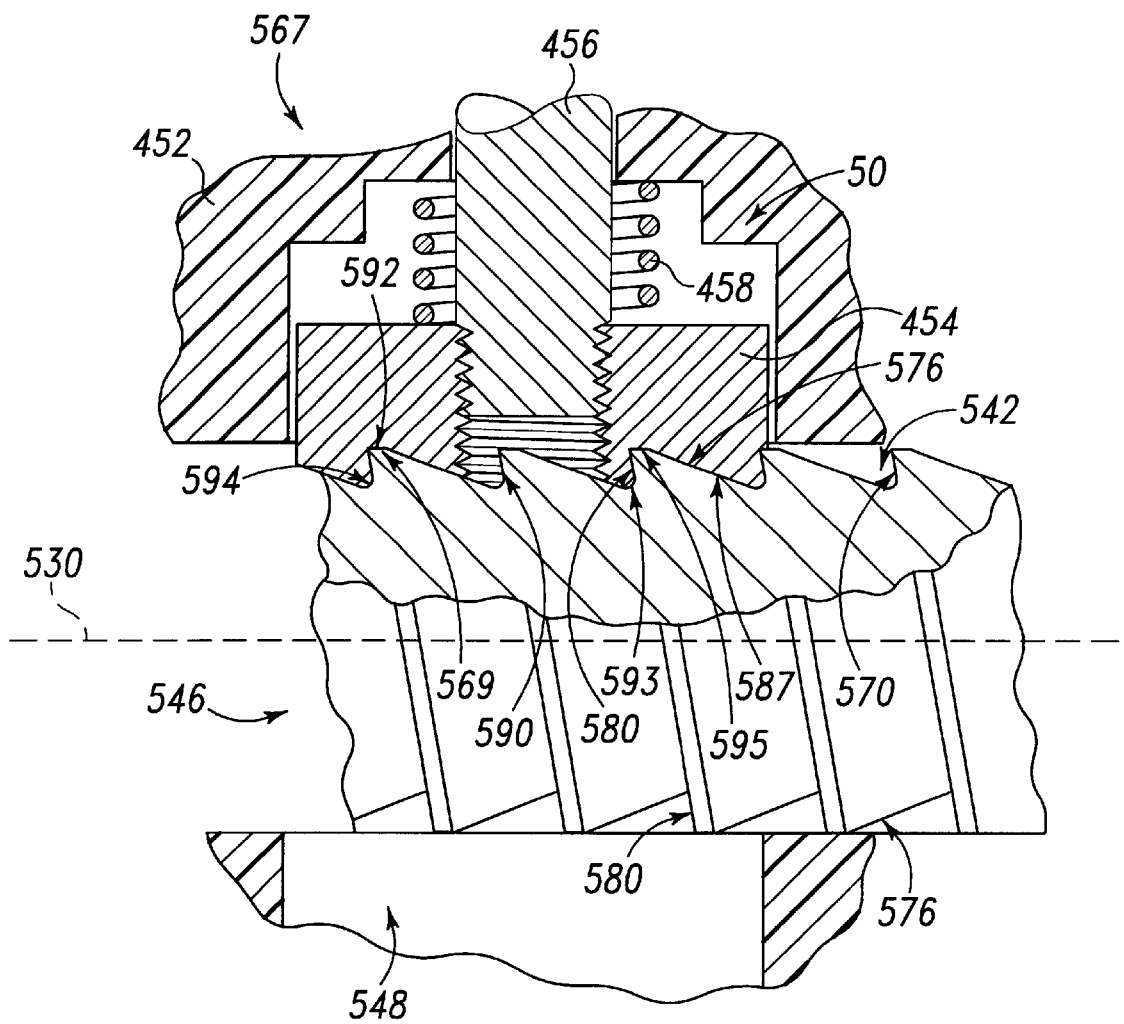

If shaft 446 is pulled a distance which is not an even multiple of pitch 584, the bias on partial nut 454 or a linear force on shaft 446 in a direction 605 opposite to first direction 601 will induce back faces 587 of partial threads 572 to slide along back face 576 of thread 542 until driven faces 590 of partial threads 572 engage driving face 580 of thread 542 causing partial threads 572 to be seated in thread 542 as shown in FIGS. 71 and 72. Thus first end 526 of shaft 446 may be stably positioned by a linear force in only a plurality of incremental positions relative to the partial nut 454. Each such incremental position is displaced from an adjacent incremental position by a distance substantially equal to the pitch 584. Thus a linear force can be applied to shaft 446 to roughly position first end 526 of shaft 446 relative to partial nut 454.

Fine tuning of the position of first end 526 of shaft 446 relative to partial nut 454 is accomplished by rotation of shaft 446. Rotation of shaft 446 causes driven faces 590 of shaft-engaging surface 574 of partial nut 454 to ride along driving face 580 of thread 542 inducing movement of first end 526 of shaft 446 lineally along longitudinal axis 530 with respect to partial nut 454. The distance first end 526 of shaft 446 moves as a result of rotation of shaft 446 is directly proportional to the angular displacement of the rotation and the pitch 584 of thread 542 of shaft 446. Since the angular displacement of the rotation can be a continues spectrum, the distance first end 526 of shaft 446 moves relative to partial nut 454 as a result of rotation of shaft 446 is a continuous spectrum of distances. Thus by rotating shaft 46, first end 526 of shaft 446 can assume a continuous spectrum of positions relative to the partial nut 454.

Figure 73:
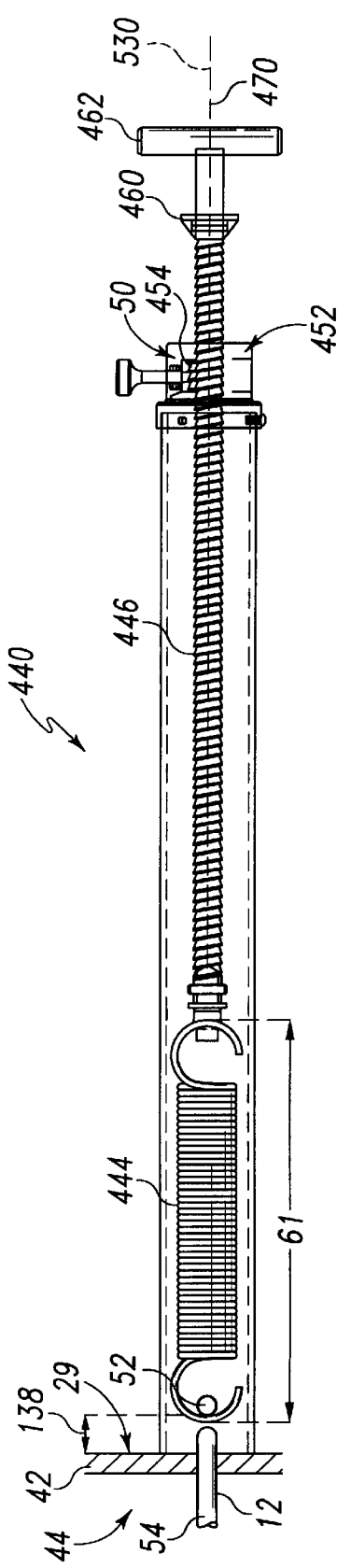
FIG. 73 is a partial cross sectional view (similar to FIGS. 5, 10, 13, and 25) of the pin retractor operator of FIG. 32 showing the threaded rod acting as tensioner in the pin retractor operator.
Figure 74:
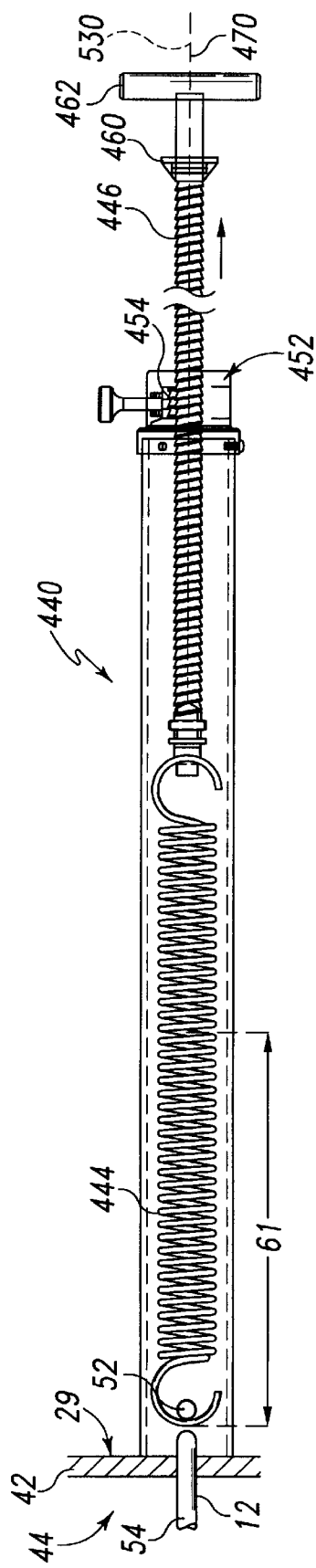
FIG. 74 is a partial cross sectional view (similar to FIG. 15) of the pin retractor operator of FIG. 73 after the tensioner has been pulled as far as the user is able partially stretching the spring of the pin retractor operator from its equilibrium at length to exert a pulling force on the handle of the pin retractor which may be insufficient to retract the pins.

Pin retractor operator 440 is attached to handle 12 in substantially the same manner as pin retractor operator 180, as shown in FIGS. 73–76. Spring biased partial nut 454 acting as ratchet/screw type directional movement regulator 50 allows threaded shaft 446 to be subjected to an external pulling force or stretching force to stretch spring 444 in the same way that smooth rod 76 and semi-toothed rod 152 are pulled to stretch springs 20, 142 in pin retractor operator 10 and pin retractor operator 150, as shown in FIGS. 73 and 74. Drivers will likely use their body weight as well as arm strength to pull threaded shaft 446.

Pin retractor operator 440 allows those drivers who are suffering from injuries and those who have lower arm strength and body weight to use a "screwing method" to stretch spring 444. When partial nut 454 engages threaded shaft 446, partial threads 572 of partial nut 454 and thread 452 of threaded shaft 446 intermesh so that rotation of threaded shaft 446 about axis 530 in the direction of arrow 607 in FIG. 75 induces movement of threaded shaft 446 along longitudinal axes 470, 530 in the same manner as if threaded shaft 446 were received in a tapped hole in cap 452. Thus, once threaded shaft 446 is extended as far as the driver can pull it because of the tension being placed in spring 444 as shown, for example, in FIG. 74, additional tension can be imposed upon spring 440 by turning grip 462 to rotate threaded shaft 446 in the appropriate direction to increase the spring tension by further increasing displacement 64 of spring 444 from its equilibrium length 61 as shown, for example, in FIGS. 74, 75. Upon retraction of pins, pin retractor operator 440 is secured to frame 42 of bogie 44 by the internal force of spring 444 which is displaced from its equilibrium length 61 by a reduced displacement 65, as shown, for example, in FIG. 76.

Multiple configurations of longitudinal and lateral slots may be incorporated into case 26, 146, 442 to accommodate initial engagement of handle 12 by handle engager 16 and movement of handle 12 upon retraction of pins 58. As previously mentioned, case 26, 146, 442 may be configured to receive the entire handle 12 and have handle 12 move within the interior 38 of case 26, 146, 442 even though this would use additional material to form case 26, 146, 442. Longitudinal slots may be formed on opposite sides of case 26 146, 443 with one or both longitudinal slots extending through and having an opening at frame-engaging end 34, i.e. an end opening slot arrangement. If the end opening slot arrangement (not shown) is used, one of the slots (the short end opening slot) may extend upwardly from frame-engaging end 34 only as far as the position of handle engager 18 when tensioning means 24 is in its unextended position. With the end opening slot arrangement short leg 52 of handle 12 may be inserted through the short end opening slot to be captured within and engaged by handle engager 16 and inserted until long leg 54 engages handle engager 16 while the end of short leg 52 extends through the other slot. As pins 58 are retracted, short leg 52 rides in the other slot and long leg 54 extends within interior 38 of case 26, 146, 442. Many other case 26, 146, 442 and slot configurations are within the teaching of this disclosure so long as case 26, 146, 442 is capable of accommodating movement of handle 12 upon retraction of pins 58.

While each of the illustrated pin retractor operators includes a coiled spring 20, 142, 220, 444 it is within the scope of this disclosure to use any type or combination of springs and/or other mechanisms providing a restorative force, e.g. bungee cords, rubber cords, elastic cords, and the like, capable of providing sufficient tension to pull handle 12 to retract pins 58.

Although the invention has been described in detail with reference to a certain illustrated embodiment, variations and modifications exist within the scope and spirit of the invention as described and defined in the following claims.

What is claimed is:

1. An operator for a pin retraction mechanism having a handle extending through a bogie frame which when pulled retracts pins coupling a trailer rail to the bogie, the operator comprising:
    a case having a frame-engaging end, a distal end, and a sidewall extending longitudinally between and connecting the frame-engaging end and distal end;
    a tensioner passing through the distal end of the case, the tensioner having a spring end and grip end, the spring end being disposed between the frame-engaging end and the distal end of the case, the tensioner being coupled for longitudinal movement relative to the distal end;
    a spring having a tensioner end and a handle end, the tensioner end being coupled to the spring end of the tensioner
    a handle engager formed to receive the handle of the pin retractor and coupled to the handle end of the spring; and
    a movement regulator regulating the movement of the tensioner with respect to the distal end.

2. The apparatus of claim 1 wherein the frame-engaging end is urged against the bogie frame and a pulling force is exerted on the handle when the handle is engaged by the handle engager and the tensioner is moved relative to the case to store energy in the spring.

3. The apparatus of claim 2 wherein the movement regulator assumes a state prohibiting movement of the tensioner which would release energy stored in the spring.

4. The apparatus of claim 2 wherein the movement regulator assumes a state permitting a linear force exerted on the grip end of the tensioner to store energy in the spring.

5. The apparatus of claim 4 wherein the tensioner comprises a shaft formed to include a thread.

6. The apparatus of claim 5 wherein the movement regulator includes a shaft engager biased to engage the shaft, the shaft engager including a shaft-engaging face having partial threads formed therein.

7. The apparatus of claim 6 wherein the movement regulator assumes a state permitting rotation of the shaft to induce movement of the shaft relative to the case to store energy in the spring.

8. The apparatus of claim 7 wherein the thread includes a driving face and the partial thread includes a driven face, the driving face of the thread and the driven face of the partial thread cooperating to urge the partial thread to seat within the thread when the tensioner is subjected to a force urging the spring end toward the frame-engaging end of the case.

9. The apparatus of claim 2 wherein the movement regulator assumes a state permitting rotation of the shaft to induce movement of the shaft relative to the case to store energy in the spring.

10. The apparatus of claim 9 wherein the movement regulator and tensioner cooperate to act as a pawl and ratchet.

11. The apparatus of claim 10 wherein the thread includes a driving face and the partial thread includes a driven face, the driving face of the thread and the driven face of the partial thread cooperating to urge the partial thread to seat within the thread when the tensioner is subjected to a force urging the spring end toward the frame-engaging end of the case.

12. The apparatus of claim 1 wherein the case is formed to include a longitudinal slot in the sidewall, the longitudinal slot having a portion of the handle received therein.

13. An operator for a pin retraction mechanism having a handle extending through a bogie frame which when pulled retracts pins coupling a trailer rail of a trailer body to the bogie, the operator comprising:
    a case having a frame-engaging end, a distal end spaced apart a fixed distance from the frame-engaging end, and a sidewall extending longitudinally between and coupling the frame engaging end to the distal end, the distal end being formed to include and aperture;
    a shaft extending through the aperture, the shaft having an interior end disposed between the frame-engaging end and the distal end and an exterior end, the shaft being mounted to the case for longitudinal movement relative thereto;
    a spring having a first end coupled to the interior end of the shaft and a second end;
    a handle engager coupled to the second end of the spring and formed to receive the handle of the pin retraction mechanism; and
    a movement regulator regulating the longitudinal movement of shaft.

14. The apparatus of claim 13 wherein the movement regulator is designed to assume a first state in which the tensioner can move bi-directionally with respect to the case and a second state in which the tensioner can move in only one direction with respect to the case.

15. The apparatus of claim 14 wherein the movement regulator permits movement of tensioner in response to a pulling force applied to exterior end of tensioner directed away from distal end of case when in the first and second state.

16. The apparatus of claim 15 wherein the tensioner includes a threaded shaft.

17. The apparatus of claim 13 wherein the case is formed to include a slot extending longitudinally along the side wall, the slot opening adjacent the handle engager and being sized to receive a portion of the handle therethrough.

18. The apparatus of claim 17 wherein the slot is designed to permit the handle to move longitudinally with respect to the case.

19. The apparatus of claim 13 wherein the operator is configured to be attached to the bogie so as to permit movement of the bogie relative to the trailer body.

20. A positioning mechanism comprising:
a shaft having a longitudinal axis extending between a first end and a spaced apart second end;
a thread formed on the shaft, the thread including a driving face and a back face defining a thread channel, the driving face forming an acute angle with respect to the longitudinal axis;
a partial nut having a shaft-engaging surface formed to include a partial thread having a driven face and a back face; and
a biasing mechanism urging the shaft-engaging surface of the partial nut against the shaft,
wherein the biasing mechanism permits a linear force applied to the shaft along the longitudinal axis in a first direction to urge the back face of the partial thread to slide along the back face of the thread to induce the shaft-engaging face away from the shaft facilitating movement of the shaft in the first direction along the longitudinal axis relative to the partial nut.

21. The apparatus of claim 20 wherein rotation of the shaft induces movement of the shaft along the longitudinal axis with respect to the nut.

22. The apparatus of claim 21 wherein a linear force applied to the shaft in a second direction opposite the first direction urges the back face of the partial nut to slide along the back face of the thread inducing the partial thread to seat in the thread inhibiting movement of the shaft along the longitudinal axis in the second direction relative to the partial nut.

23. The apparatus of claim 20 wherein a linear force applied to the shaft in a second direction opposite the first direction urges the back face of the partial nut to slide along the back face of the thread inducing the partial thread to seat in the thread inhibiting movement of the shaft along the longitudinal axis in the second direction relative to the partial nut.

24. The apparatus of claim 20 wherein the acute angle is at least 70 degrees.

25. The apparatus of claim 20 wherein the thread includes a pitch and a linear force applied to the shaft in the first direction facilitates positioning of the first end of the shaft in a plurality of incremental positions relative to the partial nut, each such incremental position being displaced from an adjacent incremental position by a distance substantially equal to the pitch.

26. The apparatus of claim 25 wherein rotation of the shaft facilitates positioning of the first end of the shaft in a continuous spectrum of positions relative to the partial nut.

* * * * *